(12) United States Patent
Gray, Jr.

(10) Patent No.: US 9,346,347 B2
(45) Date of Patent: May 24, 2016

(54) METHODS FOR SAFE OPERATION OF HYDRAULIC HYBRID VEHICLES WITH OVER-CENTER PUMP/MOTORS

(75) Inventor: Charles L. Gray, Jr., Pinckney, MI (US)

(73) Assignee: The United States of America, as represented by the Administrator of the U.S. Environmental Protection Agency, Washington, DC (US)

(*) Notice: Subject to any disclaimer, the term of this patent is extended or adjusted under 35 U.S.C. 154(b) by 834 days.

(21) Appl. No.: 13/637,847

(22) PCT Filed: Apr. 8, 2011

(86) PCT No.: PCT/US2011/031806
§ 371 (c)(1),
(2), (4) Date: Sep. 27, 2012

(87) PCT Pub. No.: WO2011/133344
PCT Pub. Date: Oct. 27, 2011

(65) Prior Publication Data
US 2013/0014499 A1    Jan. 17, 2013

Related U.S. Application Data

(60) Provisional application No. 61/326,317, filed on Apr. 21, 2010.

(51) Int. Cl.
*B60W 10/30*    (2006.01)
*B60K 6/12*    (2006.01)
(Continued)

(52) U.S. Cl.
CPC .......... *B60K 6/12* (2013.01); *B60W 10/04* (2013.01); *B60W 10/06* (2013.01); *B60W 50/038* (2013.01);
(Continued)

(58) Field of Classification Search
CPC ........ B60K 6/12; B60W 10/04; B60W 10/06; B60W 50/038; Y02T 10/6208; Y02T 10/6282; F16H 61/4192; F16H 61/421; F16H 61/439; F15B 1/024; F15B 1/027; F15B 1/033; F15B 20/00; F15B 20/002; F15B 20/004; F15B 20/008; F15B 2211/20553; F15B 2211/212; F15B 2211/8755; F15B 2211/875; F15B 2211/8752; F15B 2211/8626; F15B 2211/862; F15B 2211/87
USPC ............ 180/441, 417, 420, 421, 422; 60/403, 60/406, 413, 414
See application file for complete search history.

(56) References Cited

U.S. PATENT DOCUMENTS 4,381,702 A * 5/1983 Myers .............................. 91/506
7,647,989 B2 * 1/2010 Chan et al. ...................... 175/57

(Continued)

*Primary Examiner* — Nathaniel Wiehe
*Assistant Examiner* — Logan Kraft
(74) *Attorney, Agent, or Firm* — David H. Read

(57) ABSTRACT

Fail-safe methods for utilizing an over-center pump/motor in a hydraulic hybrid vehicle are disclosed. A high-pressure fluid shutoff valve and an optional electrically or manually operated valve are additionally provided as means to ensure disconnection of the high pressure source in the event of a failure. Displacement stroke position and pressure differentials across the pump/motor are continually monitored. On detection of various modes of failure or irregularity in control of displacement, actions are taken including any of: the high pressure and low pressure accumulators are shut off automatically or manually, a check valve between the high and low pressure ports of the pump/motor is activated, and a small amount of pressurized fluid is released from the high pressure circuit to depressurize the captive fluid. Safe startup and shutdown procedures are also specified. The system provides for safe operation of a hydraulic hybrid vehicle that includes an engine pump and drive motor, at least one of which operates over-center. The system optionally provides a displacement control valve that is controlled by feedback from an actuator or displacement position sensor and that on loss of electric power to the displacement control valve will cause the controlled pump/motor to stroke to a zero displacement position.

10 Claims, 13 Drawing Sheets

(51) Int. Cl.
| | | |
|---|---|---|
| *F15B 20/00* | (2006.01) | |
| *F16H 61/421* | (2010.01) | |
| *F15B 1/02* | (2006.01) | |
| *F15B 1/033* | (2006.01) | |
| *F16H 61/4192* | (2010.01) | |
| *F16H 61/439* | (2010.01) | |
| *B60W 10/04* | (2006.01) | |
| *B60W 10/06* | (2006.01) | |
| *B60W 50/038* | (2012.01) | |

(52) U.S. Cl.
CPC .............. *F15B 1/024* (2013.01); *F15B 1/033* (2013.01); *F15B 20/002* (2013.01); *F15B 20/004* (2013.01); *F15B 20/008* (2013.01); *F16H 61/4192* (2013.01); *F16H 61/421* (2013.01); *F16H 61/439* (2013.01); *F15B 2211/20553* (2013.01); *F15B 2211/212* (2013.01); *F15B 2211/8626* (2013.01); *F15B 2211/87* (2013.01); *F15B 2211/8752* (2013.01); *F15B 2211/8755* (2013.01); *Y02T 10/6208* (2013.01); *Y02T 10/6282* (2013.01)

(56) References Cited

U.S. PATENT DOCUMENTS 8,108,111 B2 * 1/2012 Stein et al. ............... 701/51
8,118,132 B2 * 2/2012 Gray, Jr. .................. 180/305

* cited by examiner

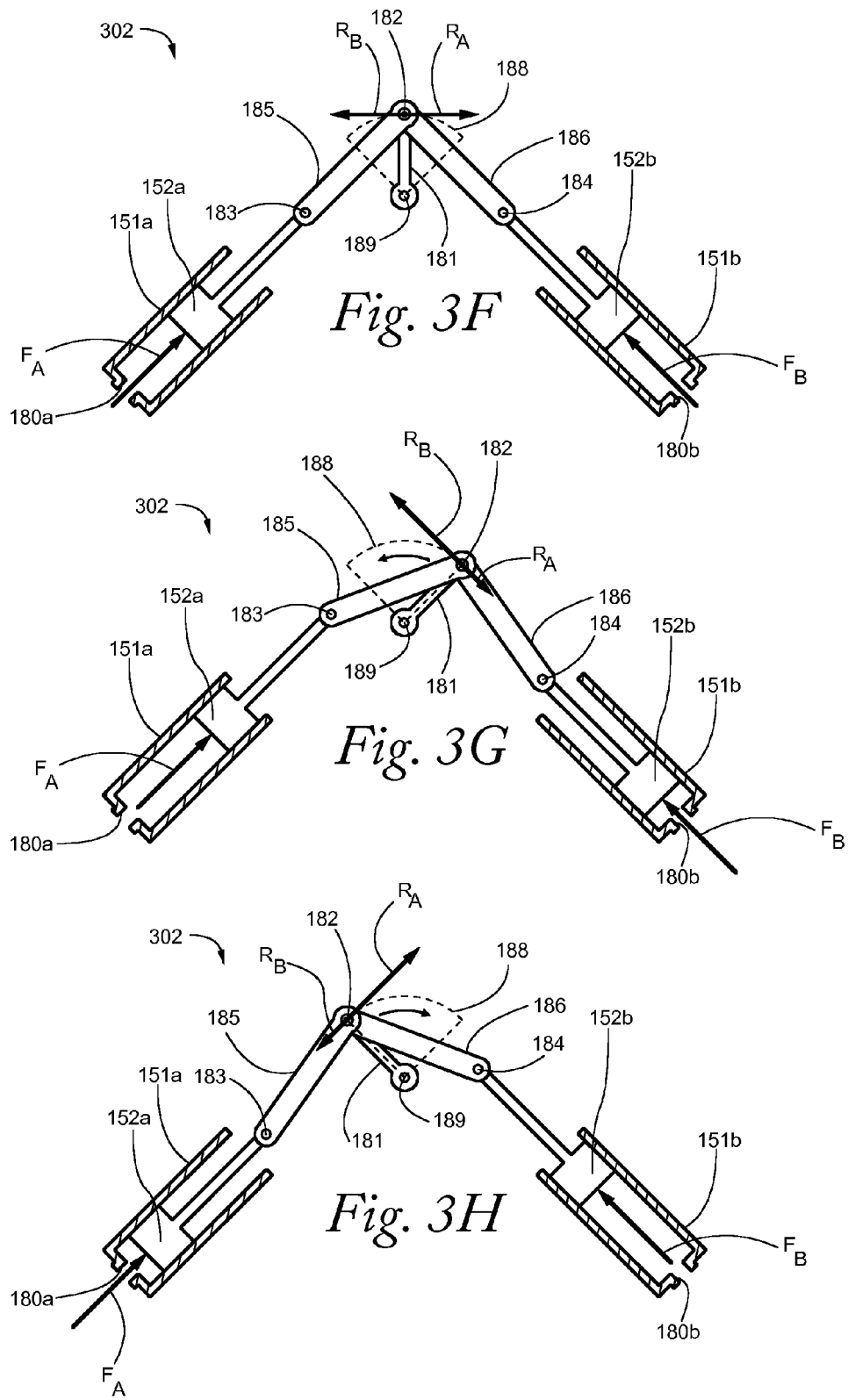

METHODS FOR SAFE OPERATION OF HYDRAULIC HYBRID VEHICLES WITH OVER-CENTER PUMP/MOTORS

This application is a U.S. national stage application, under 35 U.S.C. 371, of international application PCT/US2011/031806, filed Apr. 8, 2011, which claims benefit of U.S. provisional application 61/326,317, filed Apr. 21, 2010.

BACKGROUND OF THE INVENTION

1. Technical Field

The disclosed embodiments are directed generally to fluid power systems employing over-center motors, and, in particular, to fail-safe operations that are configured to remove output torque from a fluid motor in the event of a malfunction in the associated system.

2. Description of the Related Art

In recent years, significant interest has been generated in hybrid vehicle technology as a way to improve fuel economy and reduce the environmental impact of the large number of vehicles in operation. The term hybrid is used in reference to vehicles employing two or more power sources to provide motive energy to the vehicle. For example, hybrid electric vehicles are currently available that employ an internal combustion engine and a generator, which generates electricity to be stored in a battery of storage cells. This stored power is then used, as necessary, to drive an electric motor coupled to the drive-train of the vehicle.

There is also interest in the development of hydraulic hybrid vehicles, due to the potential for greater fuel economy, and a lower environmental impact than hybrid electric vehicles. According to one configuration, a hydraulic hybrid vehicle employs an internal combustion engine (ICE) to drive a hydraulic pump, which pressurizes hydraulic fluid. The pressurized fluid is then either used to drive a hydraulic motor coupled to the drive wheels of the vehicle, or stored in an accumulator for later use.

There is a class of hydraulic machines that may be employed in hybrid operation that includes a rotating barrel having a plurality of cylinders, and pistons reciprocating within the cylinders. The barrel is configured to rotate over a valve plate having inlet and outlet ports. As the barrel rotates over the valve plate, fluid passes into, and out of, the cylinders of the barrel. In a hydraulic pump, fluid is drawn into each cylinder from a low-pressure inlet port and forced out of the cylinder to a high-pressure outlet port. In a hydraulic motor, fluid from a high-pressure inlet enters each cylinder in turn and vents to a low-pressure outlet. Some machines, commonly referred to as pump/motors, are configured to operate as pumps and as motors, according to how fluid is applied to the machine. To operate the device as a pump, a mechanical shaft is driven by a motive source such as an engine, causing the barrel to rotate so as to pump fluid from the low pressure port to the high pressure port. To operate the device as a motor, fluid is allowed to travel through the device from the high pressure port to the low pressure port, causing the barrel to rotate, and in turn rotating the mechanical shaft from which mechanical power may be taken.

One type of pump/motor is a bent-axis pump/motor. The term "bent-axis" refers to an angle between the rotational axis of the barrel and the rotational axis of the mechanical shaft, commonly known as the stroke angle. The stroke angle determines the amount of fluid displaced by the machine per revolution of the shaft or barrel, with a larger angle corresponding to a larger displacement. In a variable-displacement bent-axis pump/motor, the stroke angle can be adjusted so as to vary the displacement of the device while it is in operation. This allows the output of the device to be varied from a maximum output at a maximum stroke angle (perhaps 45 degrees), to zero output at a zero stroke angle. Several methods are commonly employed to vary the stroke angle. In some devices, the barrel is carried on a back plate structure that slides along a bearing surface that defines the arc of angular travel and provides access to ports by which fluid enters and exits the barrel. In others, the barrel is carried on a structure known as a yoke, which defines the arc of angular travel by pivoting about a central trunnion, and carries fluid to the barrel via fluid ports originating in the trunnion and extending along one or two yoke legs to the barrel.

In what is commonly known as an over-center pump/motor, the stroke angle may be further stroked past the zero stroke angle into an angular range generally referred to as a negative-stroke angle. These pump/motors therefore have two distinct angular ranges, a positive-angle range and a negative-angle range, one of which will, by the specific configuration of the hydraulic circuit, correspond to a pump mode and the other to a motor mode. Over-center pump/motors can thereby act as drive motors or as engine pumps on a hydraulic hybrid vehicle. In the role of a drive motor, an over-center pump/motor will operate as a motor to drive the vehicle and as a pump to perform regenerative braking. As an engine pump, it operates primarily as a pump driven by the engine, but can also operate as a motor to start the engine.

Over-center pump/motors have several advantages over pump/motors that are restricted to only a positive angle. In particular, fluid switching is much simpler in comparison to a positive-angle pump/motor. In order to reverse the torque of an over-center motor, it is merely necessary to stroke from a positive angle to a negative angle, or vice-versa, while in a positive-angle motor, the polarity of the fluid ports must be reversed, which requires a fluid switching valve (commonly known as a mode valve) capable of high-speed switching of high-pressure fluids at very high flow rates. Such valves are a significant source of pressure drop in fluid supply due to the convoluted channels the fluid must pass through. They may also create undesirable noise when switched from one mode to another.

It will be recognized that, in most fluid power systems employing variable displacement machines, it is important that the motor be easily returnable to a zero-displacement condition in order to remove torque from the output shaft of the motor. Of course, in a positive-angle motor, the zero-stroke angle position is easily placed at one extreme of the range of motion of the machine; thus it only requires that an actuator controlling the angle of the motor be charged to move toward that extreme as far as possible. When the motor will not travel further, it is at zero. On the other hand, in the case of an over-center motor, such an action would drive the motor to its maximum displacement in either a positive-angle or negative-angle direction, rather than to a displacement of zero, which lies in between. Instead, to reach the relatively indefinite zero-displacement angle, the stroke angle must be controlled quite accurately, and deliberately held in this position once it is attained. Therefore, with an over-center pump/motor, reaching a zero displacement position with sufficient speed and precision inherently requires a greater degree of control.

In the design of hybrid vehicle systems, the safety of the occupants of the vehicle is of significant concern. It must be assumed that, over the lifetime of the vehicle, there will be malfunctions in the mechanical and electrical systems. It is therefore desirable to minimize the potential danger associated with such malfunctions.

Of particular concern is a loss of control over displacement of a pump/motor. Because the displacement determines the power being transmitted by the device, a loss of control over displacement could have the effect of accelerating or braking the vehicle in an uncontrolled manner, potentially causing harm to the occupants and/or to the vehicle and its components.

In a vehicular application, it is commonly known in the art to control the displacement of pump/motors by means of an electronic vehicle controller that issues electronic displacement commands to a displacement control. The displacement control commonly includes a fluid switching valve operated by one or more solenoids that respond to the electronic commands from the vehicle controller. The switching valve then actuates the displacement by directing hydraulic fluid to one or more hydraulic displacement actuators, which then would mechanically stroke the angle of the pump/motor toward the desired displacement.

Therefore it can be seen that a loss of control over displacement could be caused by an electronic control failure, or by a physical failure such as a hydraulic or mechanical malfunction.

An electronic control failure can result from a loss of electrical power or loss of electronic command signals. For example, if the vehicle controller were to lose electrical power and was no longer issuing commands to the displacement control, or if the circuit relaying the commands were to fail, or if the electrical coil of a solenoid controlling the fluid switching valve were to fail, then control over displacement would be lost. One potential provision for such an event might be to provide for the displacement control to take on a default position actuating the pump/motors to a default mode and displacement setting which the system has been designed to accommodate in a safe and stable manner. Clearly, a zero displacement position is a desirable default position because it removes the capability of transmitting torque. However, because the zero displacement position of an over-center pump/motor is mechanically indefinite, there may be some concern about the reliability of reaching this position, given that one form of failure has already occurred. For this reason it is also appropriate to consider an alternative default position that is more mechanically definite and perhaps more reliably attained. In the case of an over-center pump/motor, this mechanically definite position can only be a maximum displacement at the extreme of either the positive-stroke or negative-stroke range, that is, a maximum displacement in either pumping or motoring mode. While it may be counter-intuitive to suggest that a maximum-power position be commanded in the case of a failure, it is possible to render even this situation safe by providing for appropriate measures in the design of the circuit so that it operates in a safe and stable manner in this condition.

A physical failure is an even more fundamental concern, as it would result in total loss of control over displacement, even if the electronic controller and electrical command circuits were fully functional. For example, if the yoke of a pump/motor were to become physically immobilized by a particle of debris interfering with the yoke pivot joint, then no electronic command, nor the default actuation measure described above, would have any effect on the displacement. The pump/motor would remain frozen at whatever displacement it is at, and accordingly would continue to transmit power. Similarly, if the fluid switching valve controlling a displacement actuator were to freeze due to a particle of grit in the valve, the pump/motor would either remain hydraulically locked at its current displacement (if the valve froze in a locking position), or stroke to maximum displacement (if the valve froze in a stroking position). The inability to change displacement would either cause the vehicle to continue accelerating (if the failure occurs in a drive pump/motor while in motor mode), or brake rapidly to a stop (if it is a drive pump/motor in pump mode for regenerative braking). Either behavior would present an unacceptable safety hazard. Therefore it is important to provide for safe behavior of the vehicle even in the case where no control over displacement can be exerted and no default displacement can be attained.

In common practice, it is known to address these and similar concerns by providing each pump/motor with an isolating means by which it may be hydraulically isolated from the rest of the circuit if it becomes unresponsive to control. For example, this isolating feature might be built into the mode valve of a positive-angle pump/motor. This valve also provides a convenient way to isolate the device in case of other types of failure, such as a blow-off failure event in which the case of the pump/motor is at risk of over-pressurization due to the cylinder barrel momentarily losing its seating and allowing high pressure fluid to escape into the case. However, over-center pump/motors do not require a mode valve for mode switching, meaning that this isolation function would require the addition of a dedicated valve. Providing such a valve for each pump/motor adds to the overall cost of the system, reduces its efficiency by presenting additional flow restrictions, and increases the number of controls that the controller must manage. To reduce the cost and complexity of the system it would be preferable to omit individual isolating valves and instead rely on shutoff of the high pressure fluid source, and possibly also the low pressure reservoir, in order to de-energize the entire system when control over any pump/motor has failed.

In addition to providing for failsafe operation, there are also safety considerations related to shutting down and powering up a vehicle that utilizes over-center pump/motors. On shutdown, it is preferable that all pump/motors should be actuated to zero displacement and the high pressure accumulator hydrostatically disconnected from the circuit. While the system thus resides in a depressurized state, it is conceivable that the yoke of a pump/motor may move away from the zero position to a positive or negative angle, due to the action of gravity on the yoke, or due to any movement of the vehicle while it is shut down (for example, if the vehicle is jostled by another vehicle while parked, or if the vehicle has been towed). Therefore on startup, high pressure must only be restored to the circuit if it is certain that the drive pump/motor has remained at zero displacement; otherwise the vehicle may begin to accelerate unexpectedly when pressure is restored, or the engine pump may begin to turn the engine. While a parking pawl and a parking brake may be provided to help prevent the vehicle from moving in such a case, a better solution would ensure that each pump/motor is actually at zero displacement before restoring high pressure to the circuit; and if not, to restore it to that position. For this reason the procedure for starting up and shutting down such a vehicle is an important factor in its safety.

Additionally, the interest of minimizing the cost of a hydraulic hybrid vehicle suggests that the displacement control should be as simple as possible. By defaulting to a mechanically limited, extreme angular position rather than to a central position, the control valve may be configured with fewer control ports, and the actuator cylinders may have a simpler design. Additionally, the elimination of individual isolating valves on each pump/motor reduces cost and reduces the number of components that must be controlled by the controller.

In applicant's co-pending patent application Ser. No. 11/540,089, entitled SAFE OVER-CENTER PUMP/MOTOR, various embodiments are directed to fail-safe devices and systems that are configured to automatically command an over-center pump/motor to zero displacement and/or shut off the high-pressure fluid supply to the pump/motor in the case of a malfunction. The present invention includes several additional and alternative approaches oriented toward similar goals.

Embodiments of the invention are directed toward (a) providing for safe response to both electronic and physical loss of displacement control in a hydraulic hybrid vehicle, and (b) safe shutdown and startup procedures for such a vehicle.

It is noted that many of the disclosed provisions are also effective at addressing a blow-off failure mode, in which the cylinder barrel of a pump/motor has become unseated causing high-pressure fluid to escape into the pump/motor case. In this situation, catastrophic over-pressurization of the pump/motor case can be prevented by the measures disclosed herein.

OBJECT OF THE INVENTION

It is an object of the invention to provide a safe method of operation for a hydraulic hybrid vehicle that employs one or more over-center hydraulic pump/motors, such that loss of the ability to control displacement results in a safe and stable mode of failure without the need to employ individual isolating valves.

It is another object of the invention to provide a safe method of operation for such a vehicle such that on the absence of a displacement control signal to a pump/motor displacement control, or failure of the displacement control to react to the signal, the displacement control will by default actuate the pump/motor to a default displacement setting at which the vehicle will behave in a safe and stable manner.

It is another object of the invention to provide a safe method of operation for such a vehicle that also prevents catastrophic over-pressurization of the pump/motor case in the event of a blow-off failure.

It is another object of the invention to provide for safe shutdown and startup of such a vehicle to prevent the possibility of damage to components or unexpected movement of the vehicle when it is restarted after a shutdown.

It is yet another object of the invention to provide a failsafe method of operation for a hydraulic hybrid vehicle with over-center pump/motors that is inexpensive to implement.

SUMMARY OF THE INVENTION

Accordingly, a preferred embodiment of the invention provides for fluid supply valves controlling outflow from the high pressure and low pressure accumulators to become closed on detection of displacement control failure or case over-pressurization. Additionally, a displacement control valve is configured to default in the absence of electrical command to a state in which it hydraulically actuates a connected pump/motor to maximum displacement in an angular range corresponding to a pumping mode. Additional measures are provided to ensure safe behavior of the vehicle in these failure modes, and safe startup and shutdown of the vehicle.

BRIEF DESCRIPTION OF THE DRAWINGS

FIGS. 3F, 3G, and 3H show actuator cylinders inclined at an angle to each other so as to stroke to zero displacement when both actuator pistons are exposed to substantially equal pressure.

DETAILED DESCRIPTION

Figure 1:
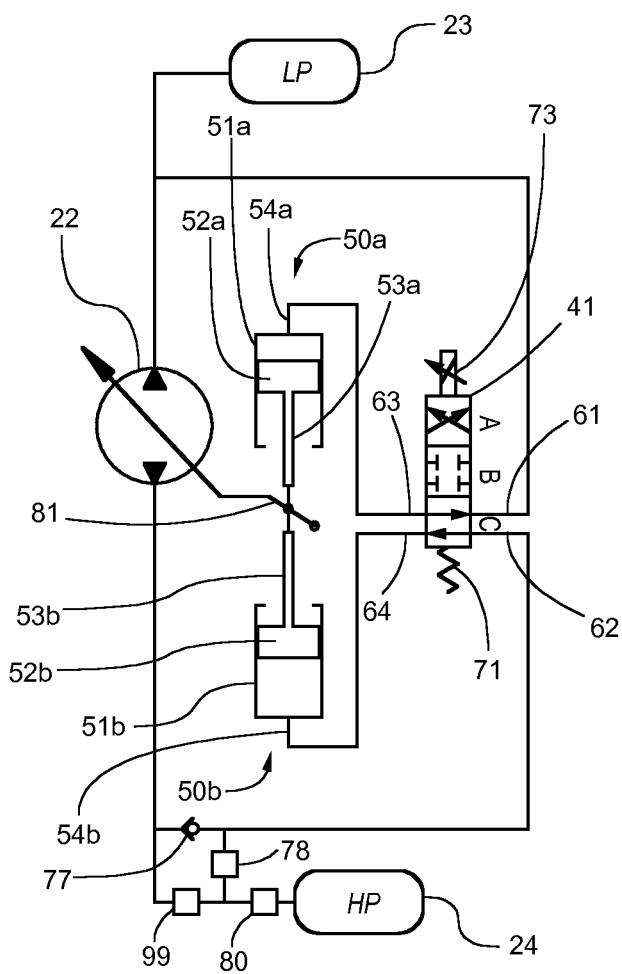
FIG. 1 shows a schematic diagram of a portion of a fluid power system according to an embodiment of the invention, highlighting the nature of the control spool and actuator.

FIG. 1 depicts a hydraulic circuit according to an embodiment of the invention, including a variable displacement hydraulic pump/motor 22 and an actuation means for setting a stroke angle (displacement) of the device. Pump/motor 22 is an over-center device that can operate either as a pump or motor by stroking to a negative or positive angle. When operating as a pump, a mechanical shaft of pump/motor 22 is rotated by means of an input mechanical torque, causing fluid from low-pressure reservoir 23 to be pumped to high-pressure accumulator 24. When operating as a motor, pump/motor 22 receives high-pressure fluid from high-pressure accumulator 24, converts it to mechanical torque delivered to the mechanical shaft, and discharges the now low-pressure fluid to low-pressure accumulator 23.

Pump/motor 22 has its displacement determined by the angular position of yoke 81. The angular position of yoke 81 is controlled by actuators 50a,b, or more specifically by the position of respective pistons 52a,b within respective cylinders 51a,b. Control spool valve 41 controls the position of pistons 52a,b by controlling the introduction of high- and low-pressure fluid to the respective cylinders. Control spool valve 41 is controlled by means of solenoid 73, which in turn is commanded by a controller means not shown. Control spool 41 has three positions, labeled here as A, B, and C. In position C, as depicted, low pressure port 61 is connected with actuator 50*a* by means of output port 63, and high pressure port 62 is connected with actuator 50*b* by means of output port 64. As long as this position is maintained by control spool 41, high pressure fluid will be flowing into actuator 50*b*, causing low pressure fluid to exit actuator 50*a*, thereby displacing the respective pistons 52*a,b* and causing the yoke to stroke in a corresponding angular direction. When the intended angle of yoke 81 has been attained, control spool 41 is moved to position B. In position B, control spool 41 blocks fluid flow, thereby trapping fluid in respective cylinders 51*a* and 51*b*, and thereby locking the yoke 81 into the attained displacement angle. In position A, the routing of high pressure and low pressure fluid to the cylinders is reversed. High pressure fluid now flows to actuator 50*a*, while actuator 50*b* is now exposed to low pressure, causing the yoke to stroke in the opposite angular direction. To stop the motion and fix the pump/motor 22 at a selected displacement, control spool 41 is again returned to position B, trapping fluid in the respective cylinders and locking yoke 81 into the attained displacement angle.

Movement of control spool 41 is controlled in one direction by solenoid 73, and is returned in the other direction by a biasing force exerted by biasing spring 71. Solenoid 73 is normally controlled by an electrical current commanded by the controller. In the absence of force exerted by solenoid 73, biasing spring 71 biases control spool 41 to position C, which may be referred to as the default position. The hydraulic circuit is configured so that position C commands the pump to stroke in a direction toward pumping mode. Therefore if control spool 41 is left indefinitely at position C, pump/motor 22 will enter pumping mode (if originally in motor mode or at zero) and stroke to maximum displacement in that mode until it reaches a mechanically defined extreme of travel. If electrical current is not present or is lost, solenoid 73 exerts no force and biasing spring 71 returns control spool 41 to position C.

Therefore it is understood that, in normal operation, a controller may cause a connected pump/motor to stroke to a desired displacement, and hold that displacement, by first issuing an electrical command to solenoid 73 to move control spool 41 to either position A or C as would correspond to the desired angular stroking direction. When the desired angular displacement has been attained, control spool 41 must then move to position B in order to stop the stroking movement. One way this can be achieved is by providing for an electronic feedback signal to be received by the controller from a sensor that monitors the yoke position, and when the desired position is about to be reached, the controller would then command solenoid 73 to move the spool to position B. Another way is to provide for a mechanical feedback force to return the spool to position B against the solenoid force when the desired angle has been achieved. For example, a biasing spring may be arranged to transmit a force proportional to the attained displacement angle, thereby opposing the solenoid force associated with that displacement, by the proper amount to return the spool to position B. Means to implement either means of feedback may be devised by anyone skilled in the art.

Valve 99 and optional valves 78 and check valve 77 are provided. Valve 99 provides means to isolate the pump/motor circuit (in particular, the power-producing rotating group) from outflow from the high pressure source (here, high-pressure accumulator 24). Valve 78 separately isolates actuator 41 from the high pressure source, allowing the actuator to remain hydraulically powered even after valve 99 has isolated the rest of the circuit, allowing actuator 41 to continue to control the displacement of pump/motor 22. Check valve 77 prevents the rest of the circuit from becoming pressurized when valve 99 is closed but valve 78 is open for control purposes, while providing an additional access path for high pressure fluid to actuator 41 during normal operation. For complete depressurization of the entire circuit, such as when the system is shut down, both valve 78 and 99 are closed to prevent any leakage through valve 41.

It should be understood that in a hydraulic hybrid vehicle application, one or more additional secondary isolation means 80 would also be expected to exist upstream (that is, toward the high pressure fluid source) of valves 78 and 99. For example, as disclosed in U.S. Pat. No. 6,619,325 "Hydraulic Hybrid Accumulator Shut-Off Valve", issued to applicant, a high-pressure accumulator such as accumulator 24 may include at its fluid outlet a flow fuse valve that can automatically close in reaction to the flow pressure generated by outflow beyond a certain rate, and which can also be commanded actively to close to outflow. For even greater safety and redundancy any number of active or passive secondary isolation means 80 might be provided between accumulator 24 and valve 99. Valve 99 is therefore best understood as a "primary" shutoff valve, being the valve that most directly protects the main hydraulic circuit, including the rotating groups of the pump/motors which transmit power. Valve 78, in order to access high pressure for the actuator circuit independently of the state of valve 99, may be located anywhere upstream of primary valve 99. Preferably, valve 78 is located upstream of valve 99 but downstream from at least one secondary isolation means 80 so that the actuation lines may also be protected by a fluid shutoff means.

Figure 2:
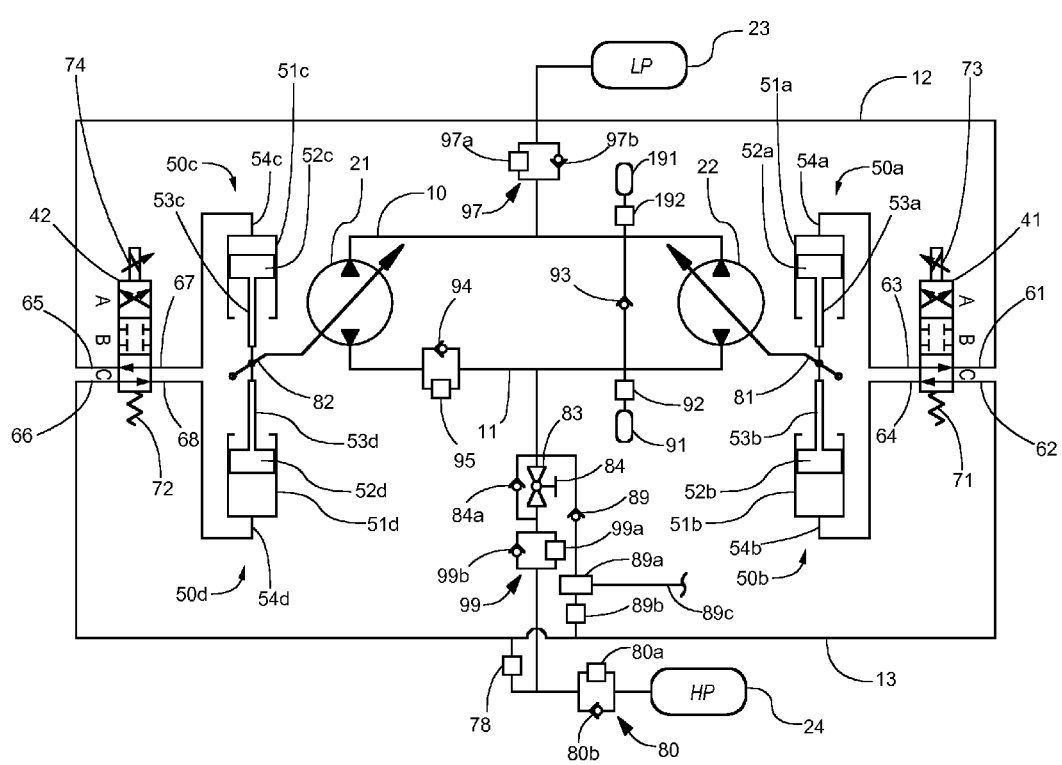
FIG. 2 shows a schematic diagram of a fluid power system according to an embodiment of the invention.

FIG. 2 depicts a fluid power system according to an embodiment of the invention, as applied to a series hydraulic hybrid vehicle. The system includes an over-center drive pump/motor 22, and an over-center engine pump 21, which is driven for example by an internal combustion engine (not shown). Actuators 50*a,b* control a stroke angle of motor 22, and control valve 41 controls actuators 50*a,b* as described with reference to FIG. 1. Similarly, for pump/motor 21, control valve 42 and actuators 50*c,d* are provided and operate in the same way as described with reference to FIG. 1. Also provided are high-pressure fluid supply 24 and low-pressure fluid supply 23.

Primary shutoff valve 99 can be closed to fluid flow from high-pressure fluid supply 24, while allowing flow in the opposite direction. This function is depicted here (for example) by a parallel arrangement of a shutoff valve 99*a* and a flow checking means 99*b* (such as a check valve). Similarly, secondary shutoff valve 80 can be closed to fluid flow from high-pressure fluid supply 24 while allowing flow in the opposite direction, also depicted here (for example) by a parallel arrangement of a shutoff valve 80*a* and a flow checking means 80*b* (such as a check valve). Similarly, low-pressure shutoff valve 97 can be closed to fluid flow from low-pressure fluid supply 23 while allowing flow in the opposite direction, depicted here (for example) by a parallel arrangement of a shutoff valve 97*a* and a flow checking means 97*b* (such as a check valve). Alternatively the shutoff and checking functions of any of valves 99, 80, or 97 could be provided by an appropriately designed single valve instead of the respectively depicted parallel arrangement, such as for example a design like the plunger-based accumulator shutoff valve disclosed in applicant's U.S. Pat. No. 6,619,325.

Also provided are check valves 89, 93, and optional valves 83, 84*a*, 94, and 95, and fluid transmission lines 10, 11, 12, and 13. High- and low-pressure fluid supplies 24, 23 may be accumulators configured to hold fluid at respective high and low pressures, or other sources such as are known in the art. A pressure differential between the high- and low-pressure fluid supplies 24, 23 is the source of motive power for both the drive pump/motor 22 and engine pump/motor 21, as well as actuators 50*a-d*.

Actuators 50*a-d* include respective control ports 54*a-d*. When high-pressure fluid is supplied to control port 54*a* as low-pressure fluid is supplied to control port 54*b*, respective pistons of the respective actuators extend and retract therefrom, moving the stroke angle of the motor 22 in a first angular direction. Conversely, when high-pressure fluid is supplied to the second control port 54*b* as low-pressure fluid is supplied to the first control port 54*a*, the respective pistons retract and extend from the actuators, moving the stroke angle of the motor 22 in the opposite angular direction. This arrangement is referred to as a push-push configuration. Fluid is thus directed by control spool 41 in response to their positioning by solenoid 73, respectively, against the biasing force exerted by biasing spring 71. The above-described action is the same for pump/motor 21, actuators 50*c,d* and control spool 42 and solenoid 74.

Control valves 41, 42 are four-port, three-position valves configured to control operation of the connected actuators 50*a-d* as previously described with reference to FIG. 1. First respective input ports 62, 66 of respective valves 41, 42 are coupled to the high-pressure fluid supply 24 via fluid transmission line 13, while second respective input ports 61, 65 are coupled to the low-pressure fluid supply 23 via transmission line 12. First and second outlet ports 64, 63 of valve 41 are coupled to respective first and second control ports 54*b,a*, and first and second outlet ports 68, 67 of valve 42 are coupled to respective first and second control ports 54*d,c*. In the schematic shown, the valve positions of a switching member, such as a spool, are labeled A, B, and C. With the valve in position B, the input and output ports of the valves 41, 42 are closed. This results in actuators 50*a,b* and 50*c,d* being hydraulically locked at whatever position they are in when respective valve 41, 42 moves to position B. This may be referred to as the neutral position of the respective valves, because there is no movement being commanded.

Loss of Displacement Control

Loss of displacement control refers to any failure that affects control over the displacement of a pump/motor. Such a failure may occur either in the electronic path that generates and conducts control signals to the hydraulic and mechanical components that determine displacement, or in the hydraulic or mechanical components themselves.

In what will be referred to herein as an electronic failure (or partial failure), a control signal or current that normally would be issued by the controller and propagated to a solenoid or similar device that controls the state of a displacement control valve (such as a spool valve) is for some reason not having the desired effect on the state of the control valve. For example, this could result from a break in an electrical connection carrying the signal or current, or failure of the controller to issue such a signal due to a malfunction of the controller, or failure of the driver of the control valve (e.g. the solenoid), or loss of electrical power to the entire system. It is assumed that the control valve is capable of taking on a default hydraulic state if allowed to do so, and that the pump/motor is capable of stroking in reaction to this hydraulic state.

In what will be referred to herein as a physical failure (or complete failure), the displacement of the pump/motor is not responsive due to a physical or hydraulic malfunction, regardless of whether or not the electronic circuit is functioning. For example, this could result from the yoke pivot being slowed or immobilized by a particle of debris interfering with the pivot joint, or an actuator cylinder being similarly affected, or the displacement control valve being stuck in a fixed position so as to hydraulically lock the actuator cylinders or to command the pump/motor to stroke toward one direction or the other. In this case, no control is possible over the displacement or mode of the pump/motor. Accordingly one can only attempt to minimize the effect it has on the behavior of the vehicle and the integrity of the hydraulic circuit.

Physical (Complete) Failure

The following discussion discloses methods for response to physical failure modes in which one or more pump/motors are not responsive to any displacement control. The primary goal in this type of failure is to prevent the drive motor from continuing to propel the vehicle in an uncontrolled manner, or to prevent uncontrolled braking, or to prevent the engine pump from damaging the engine, depending on which pump/motor is affected by the failure, and which mode it is in.

On detection of this mode of failure, or by default on loss of electrical power, low pressure accumulator valve 97 and primary shutoff valve 99 default to a position in which they are shut to outflow from their respective accumulators, while continuing to allow flow into their respective accumulators through checking means 97*b* and 99*b*, respectively. The engine connected to engine pump 21 shuts off as well.

Optional check valve 93 and vent valve means 92, 91 are also provided. A manual high pressure isolation valve 83, such as for example a ball valve, is also optionally provided as a backup for shutting off outflow from the high pressure accumulator in case high pressure valve 99 fails to close.

If the malfunctioning unit is a drive motor, with the output shaft being mechanically connected to the wheels, then if the vehicle is in motion at the time of failure, the shaft of the drive motor will naturally continue to be rotated by motion of the vehicle even after the high pressure source is disconnected. It will thereby naturally act upon any fluid entrained in the circuit according to whatever mode the unit is in, potentially causing damaging effects on the system, unless appropriate measures are provided to mitigate the effects.

Suppose that drive motor 22 is stuck in pumping mode (i.e. the failure occurs during regenerative braking) and the vehicle is in motion, causing continued rotation of drive motor 22. This rotation attempts to pump fluid from line 10 toward line 11. High pressure accumulator 24 and low pressure accumulator 23 have been closed to outflow, and the engine that drives the engine pump has been shut off. Accordingly, low pressure accumulator 23 cannot supply fluid to line 10 to replace what would be pumped out. This leads to the possibility of either fluid being sucked from the low pressure outlet of engine pump 21, or cavitation occurring in line 10. Meanwhile, line 11 experiences potential pressurization by the pumping action of drive motor 22, leading to the possibility of several undesired effects, such as pumping a small amount of net fluid into high pressure accumulator 24, or creating unnecessary pressurization of line 11, or even forming a closed hydrostatic loop with engine pump 21 and thereby causing the engine pump to turn the engine. Any of these effects, in addition to having potentially damaging effects on the system, may bring about a potentially unwanted braking force on the vehicle, when it may be preferable instead to allow the vehicle to coast as long as possible in order to reach a safe location off road.

To prevent these potential occurrences, high pressure circuit 11 is optionally provided with vent valve 92, that may be activated by the controller to relieve pressure in the fluid trapped in line 11, by allowing a small volume of the fluid to exit into small low-pressure (which could, for example, be at or near atmospheric pressure) holding tank 91. This immediately neutralizes any potential fluid-pumping effect of drive pump/motor 22. Additionally, optional vent valve 192 may be activated to relieve cavitation within low pressure line 10 and also to mitigate the effect of the circuit losing fluid to low-pressure tank 91.

Now suppose that drive motor 22 is stuck in motor mode, and the vehicle is in motion, causing continued rotation of drive motor 22. This rotation attempts to pump fluid from line 11 toward line 10. High pressure accumulator 24 and low pressure accumulator 23 have been closed to outflow, and the engine that drives the engine pump has been shut off. Accordingly, high pressure accumulator 24 cannot supply fluid to line 11 to replace what would be pumped out. This leads to the possibility of either fluid being sucked from the high pressure port of engine pump 21, or cavitation occurring in line 11.

To prevent cavitation in line 11, and the possibility of rotating engine pump 21 by suction of fluid, check valve 93 is optionally provided between the high pressure and low pressure side of the circuit to create a circulating loop of low pressure across the ports of the motor thereby neutralizing the effect of the pumping of drive motor 22. In this failure mode, low pressure accumulator 23 optionally may remain open to outflow.

Suppose now that engine pump 21 is stuck in either motor or pump mode. High pressure accumulator 24 and low pressure accumulator 23 have been closed to outflow, and the engine that drives the engine pump has been shut off. This unavailability of high pressure fluid prevents the pump from having power to turn the engine, or from delivering unwanted power to the drive motor, no matter which mode or displacement it is in. More specifically, it is thus prevented from turning the engine in a reverse direction if stuck in pump mode, and it would not turn the engine in a forward direction (i.e., attempt to "start" it) if stuck in motor mode.

Suppose now that engine pump 21 is stuck in either motor or pump mode, and drive pump/motor 22 is stuck in pumping mode, or has by default been stroked to pump mode, and is being turned by vehicle inertia. This creates the possibility that drive motor 22 and engine pump 21 may create a hydrostatic loop in which engine pump 21 is driven to rotate by the fluid being pumped by drive motor 22. The engine, being mechanically connected to engine pump 21, would also rotate, thereby exerting a braking force on the vehicle and eventually bringing it to a stop. This effect may be prevented by opening optional low pressure dump valve 192 (releasing some fluid to holding tank 191), to depressurize the low pressure side of the circuit and prevent the hydrostatic loop from forming, or by opening optional high-pressure dump valve 92 to prevent the hydrostatic loop from forming.

It is noted that, when high pressure accumulator 24 and low pressure accumulator 23 are shut to outflow in response to a failure, it is also possible to delay this closure long enough that all non-failed pump/motors may be stroked to zero displacement prior to closure. However, because time is critical in response to failures such as those described here, it is sufficient to perform closure immediately, as the denial of fluid outflow from the system fluid sources will still serve to neutralize any non-failed pump/motors that remain at a non-zero displacement.

In another embodiment, one or more over-center pump/motor(s) are provided with its own high pressure on/off valve, allowing independent isolation of the respective unit in case of its failure. This is particularly desirable for an engine pump, in which case its failure and subsequent isolation would not prevent the drive motor from continuing to operate, allowing the vehicle to be propelled for some time by energy in the high pressure accumulator to reach a safe location off road.

Referring again to FIG. 2, in another embodiment, in which an isolating on/off valve is not employed on each pump/motor (and only accumulator shut off valves are employed), in-line valve 83 is optionally added just after the high pressure shut off valve 99. Valve 83 provides a safety backup in case the high pressure shut off valve were to fail to shut, for example, due to debris that causes valve 99 to stick. Once closed, valve 83 would prevent both outflow and inflow with respect to high pressure accumulator 24. Optionally a parallel check valve 84a could be added with valve 83 to allow inflow when valve 83 has been closed.

Alternatively, if valve 83 were a ball valve, it would normally be in a fully open position, and could be held to that position by a breakable means, such as for example a plastic tie, that could be broken in order to close the valve. Valve 83 could be either manually activated by hand wheel 84 or a similar means, or electronically activated on command by the driver or electronic controller. Because equal pressure would exist on both sides of valve 83 if the high pressure valve 99 has failed to shut, only a small amount of torque would be necessary to turn the valve 83 into a closed position. Once shut, pressure would not be equal across the valve and therefore the valve would be more difficult to re-open than to initially close. However, under this serious failure mode, it would ordinarily call for careful examination and repair of the high pressure valve before re-opening the valve should be considered.

Electronic (Partial) Failure

The following discussion discloses methods for responding to failure modes in which electronic command is not present. This includes failures such as: failure of the vehicle controller, loss of command over a displacement control solenoid (in the case of an isolated electronic malfunction), or loss of command over additional or all controlled components (in the case of a broader electronic malfunction or a complete loss of electrical power). It is assumed that pump/motors and their displacement control valves remain hydraulically and physically functional. Accordingly, disclosed methods of responding to this type of failure include providing for the displacement control valve(s) to take on a default state that hydraulically commands the respective pump/motor(s) to a default mode and displacement, and closing the fluid sources to outflow.

According to a preferred embodiment of the invention, in the absence of electrical power or control signal to solenoid 73 or 74, respective biasing spring 71 or 72 forces the respective control spool 41 or 42 to an extreme position, depicted here as position C, in which the respective over-center pump/motor to which it is connected is hydraulically commanded to stroke to pumping mode. By staying in this position rather than returning to a neutral position, the actuator becomes fully engaged and thereby strokes the respective over-center pump/motor to its maximum possible displacement in pumping mode, a position that is mechanically defined according to the physical structure of the pump/motor. The same behavior is true with respect to actuation of both pump/motors 21 and 22.

Additionally, in the absence of electrical power or control signal, low pressure accumulator valve 97 and primary shut-off valve 99 each default to a position in which it is shut to outflow, thus preventing fluid from exiting their respective accumulators, while continuing to allow flow into their respective accumulators through means such as checking means 97b and 99b, respectively.

Additionally, in the absence of electrical power or control signal, the engine connected to engine pump 21 shuts off.

With respect to drive motor 22, maximum pumping mode is equivalent to maximum regenerative braking mode. Ordinarily this would cause the vehicle to be braked rapidly to a stop, and in fact this could still occur if for some reason low pressure accumulator 23 failed to close to outflow. However, assuming that low-pressure accumulator 23 does close, it now cannot provide fluid to be pumped to the high-pressure accumulator 24, and therefore continued rotation of pump/motor 22 can only create cavitation within the fluid trapped in low pressure line 10. This cavitation will result in a much smaller level of braking force, allowing the vehicle more time to coast to a safe location off road.

In this condition, the portion of the high pressure line 11 between drive pump/motor 22 and high pressure accumulator 24 continues to be under high pressure as drive pump/motor 22 attempts to pump fluid to it. This potentially creates several difficulties. First, high pressure fluid is trapped within line 11 and will undergo pumping force. If optional valve 83 (discussed in a later part of this document) is closed, this fluid has no outlet, being also stopped by optional check valve 94, and can cause damaging pressurization within line 11. Second, if optional valve 83 is open, this pumping action may potentially be capable of causing a small amount of net flow, approximately equal to the volume being cavitated on the low pressure side, to leave the trapped circuit and enter high pressure accumulator 24, because accumulator 24 remains open to inflow despite being closed to outflow. Any volume thus removed cannot be replaced by outflow from low pressure accumulator 23 to restore the vacuum in the cavitated volume. Third, any leakage from the high pressure side to the low pressure side (including the compressibility flow of a high pressure cylinder crossing over TDC to the low pressure side) would be picked up by the suction pistons and re-supplied (pumped) to the high pressure side, thus continuing a braking effect from drive pump/motor 22.

To prevent these effects, high pressure line 11 is optionally provided with a vent valve 92 that may be activated by the controller (or automatically activated on loss of signal from a failed controller) to relieve pressure in the entrapped fluid by allowing a small volume of fluid to exit into small low-pressure holding tank 91. Once vent valve 92 allows the trapped high pressure column to depressurize, the pumping action performed by drive pump/motor 22 is neutralized.

Normally, once a drive motor is placed into pump mode (for example, to perform regenerative braking), it is very important to switch the motor out of pump mode before the vehicle comes to a stop, or else the motor would begin to drive the vehicle in reverse as soon as vehicle inertia has stopped delivering torque to it. However, in this failure mode, with high pressure accumulator 24 having been shut to outflow, drive pump/motor 22 does not have power to drive the vehicle in reverse, and therefore drive pump/motor 22 may be safely left in pump mode even after the vehicle has stopped.

With respect to engine pump 21, closure of low pressure source 23 would possibly cause the engine to be turned in a reverse direction, since both the engine pump 21 and drive motor 22 would be in pumping mode, and therefore drive motor 22, in attempting to carry out its pumping action driven by the inertia of the vehicle, could form a closed hydrostatic loop with engine pump 21 and thereby begin to drive engine pump 21 hydrostatically. This is prevented by activation of vent valve 92, relieving pressure in line 11 and thereby removing the ability to turn pump/motor 21.

This could alternatively be prevented by use of optional check valve 94 in the high pressure line so as to allow high pressure flow only away from engine pump 21 and not toward it. In order to preserve the ability to start the engine by means of engine pump 21, optional parallel electrically controlled on-off valve 95 bypasses optional check valve 94 in this mode. Optional on-off valve 95 is normally in the closed position and only opened by controller command to temporarily enable the start function when it is necessary to start the engine by means of engine pump 21.

In an alternate embodiment, rather than causing over-center pump/motors to default to maximum displacement in pumping mode, a similar effect is obtained by causing the pump/motors to default to maximum displacement in motoring mode, which is also a mechanically defined position, although at the opposite extreme of yoke travel. Accordingly, in an alternate embodiment, position C is configured so as to command the connected pump/motor into motoring mode rather than pumping mode. As before, low-pressure accumulator 23 and high-pressure accumulator 24 are closed to outflow by means of fluid supply valves 97 and 99 respectively, both of which default to a closed position when control power is lost or removed.

With respect to drive motor 22, this failure action would cause it to enter a maximum drive torque mode. Ordinarily this would cause the vehicle to accelerate at a maximum rate. However, because the high-pressure accumulator 23 has been shut to outflow, no torque will be delivered by the drive pump/motor 22. Continued rotation of drive pump/motor 22 by inertia of the vehicle (if it is in motion) can only create cavitation within the fluid trapped in high pressure line 11 as pump/motor 22 attempts to direct fluid from high pressure to low. This cavitation will incidentally result in a modest level of braking force.

To remove the possibility of a closed hydrostatic loop being formed with engine pump 21 and thereby causing it to turn, optional low pressure dump valve 192 may be opened, causing the fluid in low pressure line 10 to be exhausted to optional low-pressure dump tank 191.

With respect to engine pump 21, stroking to a default motoring position would ordinarily cause it to rotate the engine. However, because the high-pressure accumulator 24 is also closed to outflow, no fluid power is available to cause this to happen.

If drive pump/motor 22 has also failed by sticking in a pumping position, and it continues to rotate by inertia of the moving vehicle, there is a possibility that engine pump 21 might receive this flow of fluid by way of high-pressure line 11 and therefore be powered by that flow. In this case dump valve 92 is provided to depressurize line 11 and prevent this from occurring.

An alternate embodiment is now described in which the position of the control spool is controlled by two solenoids, and in which loss of current to both solenoids sends the control spool to a central position that hydraulically commands the controlled pump/motor to zero displacement by either of two self-zeroing mechanisms. This mechanism contrasts with the previous embodiments in which the control spool commands the pump to maximum displacement in pumping or motoring mode.

Self-Zeroing Behavior

It would be desirable to provide for means to automatically stroke the pump/motor to zero displacement when equal fluid pressure is applied to both actuation cylinders. Equal fluid pressure may easily be applied by causing the control spool to default to a position in which both actuators are exposed to high pressure. To ensure self-zeroing behavior under this condition, it is necessary to design the actuator and linkage system such that it seeks the zero displacement position when presented with equal pressure at both actuators.

In an embodiment of applicant's co-pending patent application Ser. No. 11/540,089, entitled SAFE OVER-CENTER PUMP/MOTOR, which is incorporated herein by reference in its entirety, the operation of a control spool that on loss of current automatically moves to a spool position that strokes an over-center motor to zero displacement is outlined in detail. In such failure mode, the spool is configured to connect both actuators to a high pressure source of substantially equal pressure.

Figure 3A:
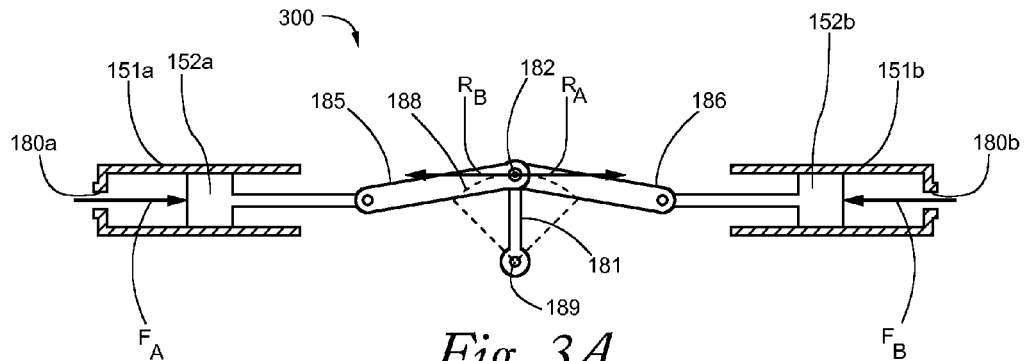
FIGS. 3A, 3B, and 3C show actuator cylinders in an in-line arrangement according to known art.
Figure 3B:
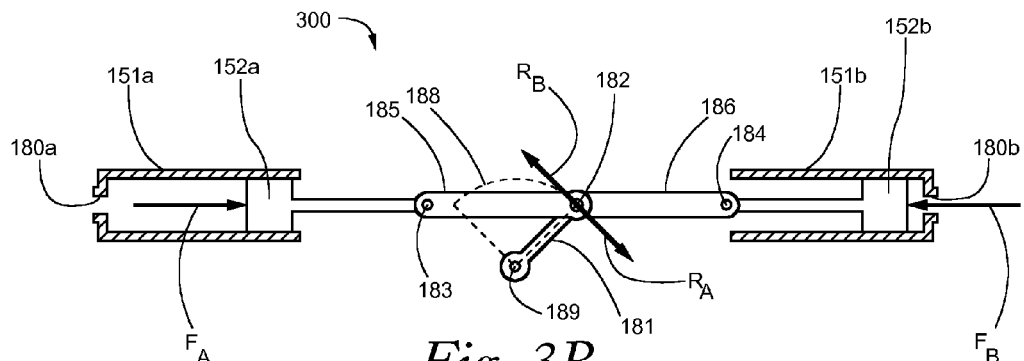
Figure 3C:
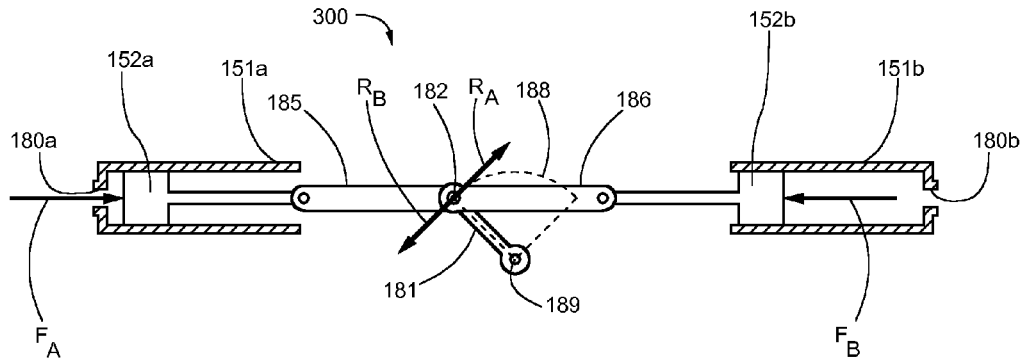

If packaging were the only concern in the design of an actuation system, it may be preferable to orient each of the two actuator cylinders parallel to each other, such that the respective actuator pistons exert force in opposite directions. However, one disadvantage of such an arrangement is that the respective actuators may fail to move the yoke when presented with equal fluid pressures. This is illustrated in FIGS. 3A-3C, which show a prior art push-push actuator system with in-line actuator cylinders and linkages. In FIG. 3A, the yoke is shown in zero-displacement position, with equal pressure at each actuator cylinder keeping it at zero. Application of equal fluid pressure to both cylinders 151a and 151b results in pressure force F(A) presented to piston 152a, and pressure force F(B) presented to piston 152b. These forces propagate through respective linkages 185, 186 and create respective resultant moment forces R(A), R(B). Because the angle of linkage 186 with yoke 181, and the angle of linkage 185 with yoke 181, are the same, R(A) and R(B) are substantially equal and opposite. The moment forces therefore cancel, and yoke 181 does not pivot. In order to cause yoke 181 to pivot, either F(B) or F(A) must be greater, meaning that greater pressure must be placed on one of the actuator cylinders. A similar effect occurs when yoke 181 resides at maximum displacement in either stroking direction, as shown in FIGS. 3B and 3C. At intermediate displacements, a small net moment may exist, but will be small in magnitude owing to the generally small difference in linkage-to-yoke angle throughout this range. This actuation arrangement therefore is not effective at ensuring yoke centering when both actuators are presented with equal fluid pressure.

Self-Zeroing by Actuator Cups

Figure 3D:
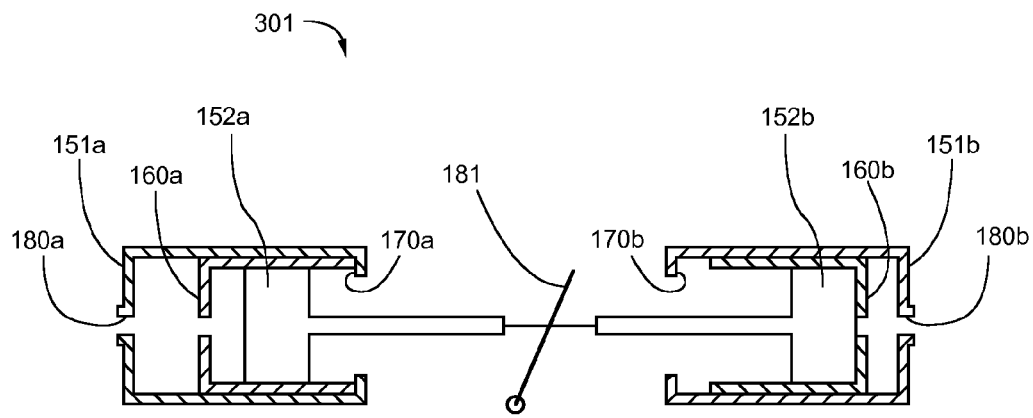
FIGS. 3D and 3E show an alternate design for the actuator cylinders enabling a failsafe actuation to zero displacement as described with respect to FIGS. 4A-4E.
Figure 3E:
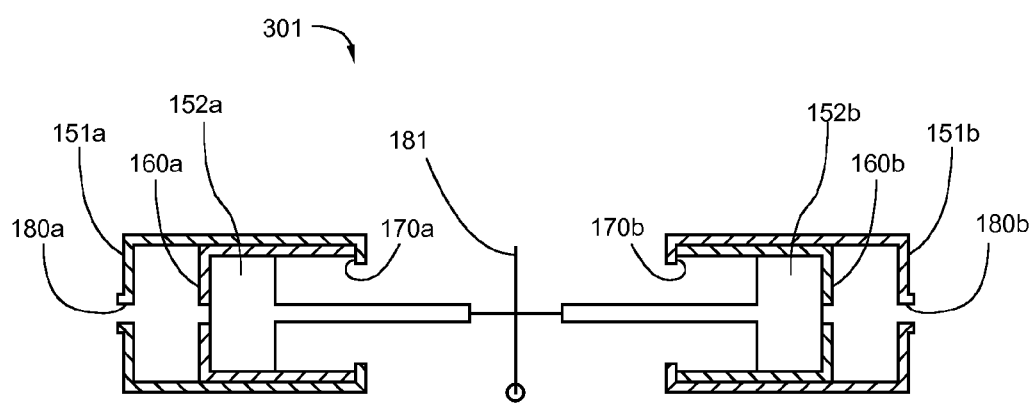

A design for an actuation system that responds to equal pressure at each actuator by stroking the pump/motor to zero displacement is now reviewed, which here is presented as prior art in reference to its disclosure in the co-pending application. For convenience in understanding the present invention, the specific actuator cylinder design disclosed in the cited co-pending application is reviewed here and by reference to FIGS. 3D and 3E. A displacement angle of a pump/motor (not shown) is determined by an angular position of yoke 181, which in turn is determined by the position of two actuator pistons 152a and 152b relative to their respective actuator cylinders 151a and 151b. Actuator cylinders 151a and 151b are fixed relative to each other and relative the pivot of yoke 181. Pistons 152a and 152b are free to slide within respective actuator cups 160a and 160b. Actuator cups 160a and 160b are likewise free to slide within respective cylinders 151a and 151b. The positions of pistons 152a and 152b are controlled by passage of fluid into and out of respective ports 180a and 180b, so as to displace the respective pistons, and/or the cups they reside in, to a desired position. Ports 180a and 180b are each in fluid communication with a respective output port of a displacement control spool valve, such as those numbered 810a and 810b in FIGS. 4A-4E.

With respect to describing the present invention, the important aspect of this design is its behavior when both ports 180a and 180b are placed in communication with substantially equal high pressure. Because the surface area of actuator cups 160a and 160b are each larger than the surface area of respective pistons 152a and 152b, the dominant fluid force acting upon the cups and the pistons will be exerted on the actuator cups, driving each inward until they come into contact with respective stops 170a and 170b. In this position, pistons 152a and 152b are forced into the depicted position which corresponds with a zero displacement yoke position, thereby actuating the pump/motor to zero displacement in a steady-state manner without need for continuous control and monitoring of the yoke position. This actuation design thereby serves to enable a default stroke command to zero displacement, by simply causing the control spool to default to a position in which both actuator ports are exposed to equal fluid pressure.

Self-Zeroing by Inclined Actuators

As an alternative to the failsafe cups design with parallel actuation cylinders, the actuators may be placed at an inclined angle with respect to each other and the failsafe cups eliminated. In this configuration, the actuators will automatically tend to stroke the yoke to zero displacement when presented with equal pressures.

Referring now to FIG. 3F, actuation system 302 has actuators 151a and 151b inclined at a significant angle with respect to the zero-displacement position of yoke 181. When equal fluid pressure is presented to each of port 180a and port 180b, equal fluid forces F(A) and F(B) are propagated through respective linkages 185, 186 to yoke 181. Each force resolves into respective moment forces R(A) and R(B) acting upon the yoke connection 182. In the depicted zero-displacement position, R(A) and R(B) are substantially equal and opposite, and no movement away from this position will occur. Referring now to FIG. 3G, the actuation system 302 is shown at a maximum displacement angle. Equal fluid forces F(A) and F(B) are again propagated through linkages 185, 186 to exert moments R(A) and R(B) upon yoke connection 182. Now, due to the small angle between linkage 185 and yoke 181, and the large angle between linkage 186 and yoke 181, R(B) is substantially larger than R(A), causing a resultant force to pivot yoke 181 in the depicted counterclockwise direction, toward zero displacement. Similarly, as depicted in FIG. 3H, equal pressure at each actuator also causes yoke movement from the opposite direction toward zero displacement. The exact magnitude of the resultant moment exerted toward zero displacement may be controlled by design of the angles of the actuators and linkages with respect to the zero displacement position of yoke 181.

Referring now to FIGS. 4A-4E, a five-port, four-position control spool valve 800 for use with either self-zeroing actuation method is depicted. Control spool valve 800 is analogous in its function to the control spool valve 41 of FIG. 1, in that it controls flow of high- and low-pressure fluid to and from a pair of actuator cylinders (not shown) thereby causing the yoke of the controlled pump/motor to stroke in one angular direction or the other and thereby changing the displacement of the device. However, control spool valve 800 is addressed to a pair of actuators of the sort depicted in FIGS. 3D-3E or FIGS. 3F-3H, which stroke the pump to zero displacement in response to equal pressure at each actuator. Control spool valve 800 is configured to default to a central spool position in which both actuator feeds are connected with a substantially equal high pressure source.

Figure 4A:
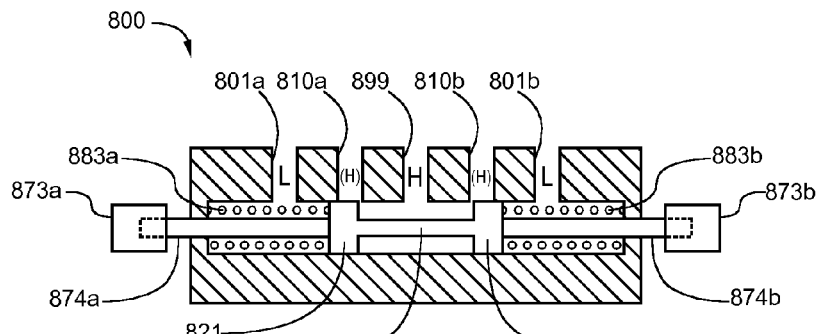
FIGS. 4A-4E show an alternate embodiment in which the position of the control spool is controlled by two opposing solenoids, and in which loss of current to both solenoids allows the control spool to fail to a central default position that commands the controlled pump/motor to zero displacement.

The position of control spool 829 is controlled by means of solenoids 873a and 873b, which have respective solenoid pistons 874a and 874b each connected to control spool 829. Solenoids 873a,b are commanded by a controller means not shown. The controller means takes into account electronic feedback regarding the yoke position in determining how to command the solenoids. In addition, respective biasing springs 883a and 883b act to bias spool 829 to a central position in the absence of solenoid force. FIG. 4A shows the control spool in this central position. In this position it can be seen that actuator feed port 810a and actuator feed port 810b are both in fluid communication with high pressure access port 899.

Figure 4B:
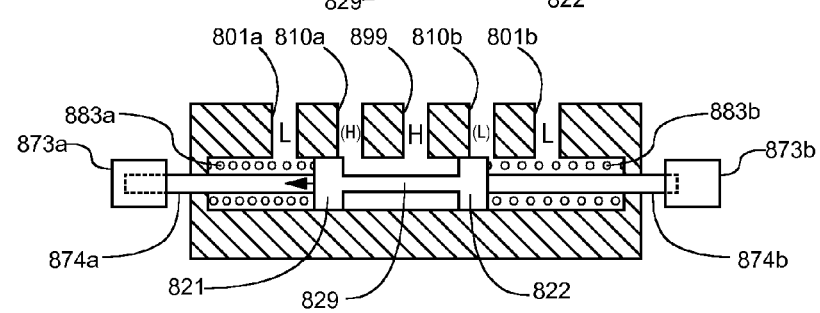

Referring now to FIG. 4B, solenoid 873a has been energized so that solenoid piston 874a pulls spool 829 in a direction leftward as depicted. Now, spool 829 no longer connects actuator feed port 810b with high pressure port 899, but instead places it in fluid communication with low-pressure access port 802. In this position, fluid exits the actuator cylinder that is connected to port 810b through actuator port 810b to enter low pressure access port 801b, and a similar amount of high-pressure fluid enters actuator port 810a from high pressure access port 899, thereby causing the pump to stroke in a first angular direction.

Figure 4C:
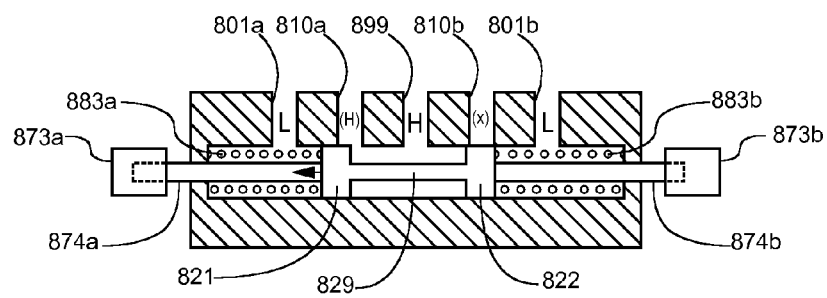

This stroking motion is stopped by returning spool 829 to the position depicted in FIG. 4C, which may be achieved by reducing current to solenoid 873a causing solenoid piston 874a to extend slightly to the depicted position. Now, spool 829 has blocked actuator feed port 810b, thereby trapping any fluid contained in the connected actuator cylinder. Owing to the fact that both actuator cylinders are connected in a push-push configuration, this effectively prevents either actuator cylinder from changing position and thereby locks the displacement of the connected pump/motor to the position it had attained at the time port 810b became blocked. In order that spool 829 should achieve this position at the proper time so as to reach a desired displacement, electronic feedback regarding the position of the yoke is continually provided to the controller, which responds by commanding solenoid 873a to place the spool 829 in this position in order to stop the yoke at the desired displacement position.

Figure 4D:
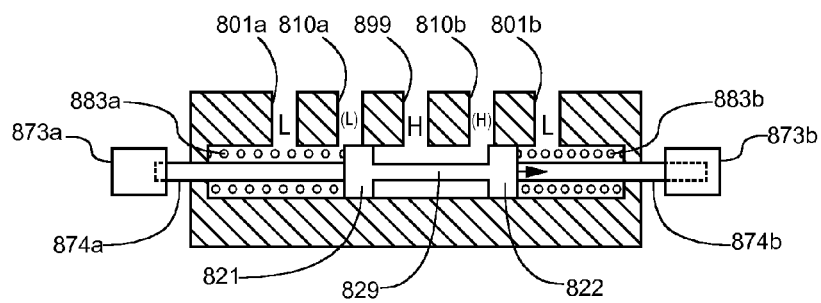

To stroke the connected pump/motor in a second (opposite) angular direction, solenoid 873b is energized, causing solenoid piston 874b to pull control spool 829 to a position in a rightward direction as depicted in FIG. 4D. Now, it is actuator port 810a that is connected to low pressure, via access port 801a, and actuator port 810b is connected to high pressure access port 899. Accordingly the connected pump/motor will stroke in a direction opposite to the direction associated with the positions described in previous FIG. 4B.

Figure 4E:
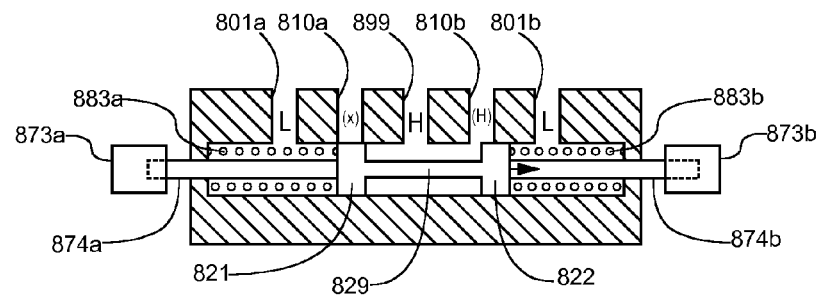

Referring finally to FIG. 4E, in order to stop the stroking movement in the second direction at a desired displacement angle, current has been reduced to solenoid 873b allowing solenoid piston 874b to extend slightly so that spool 829 is allowed to retreat in a direction slightly leftward as depicted. Now, spool 829 blocks access to actuator feed port 810a, thereby trapping any fluid contained in the connected actuator cylinder. Owing to the fact that both actuator cylinders are connected in a push-push configuration, this effectively prevents the actuator cylinders from changing position and thereby locks the displacement of the connected pump/motor to a fixed position, similarly to the state depicted in FIG. 4C. Again, in determining when to command the solenoid to slightly retract as depicted, the controller has taken into account electronic feedback regarding the yoke position so as to thereby lock the displacement at the desired displacement angle.

In operation, to control the displacement of the connected pump/motor, a controller issues appropriate commands to solenoids 873a and 873b such that fluid is allowed to enter and exit the respective connected actuator cylinders in order to achieve a displacement position, and once the desired position is achieved, the low pressure access port is blocked as described above in order to cause the pump/motor to remain in that displacement position. The electronic feedback means allows the controller to continually monitor the achieved displacement position in order to determine how the position of the spool should be changed to an open or blocked position in order to achieve the displacement position desired by the controller.

If current is lost to both solenoids 873a and 873b, respective biasing springs 883a and 883b exert a substantially equal force in both directions upon spool 829, causing it to take on the position depicted in FIG. 4A in which both actuator feed ports 810a and 810b are exposed to a substantially equal high pressure source, thereby causing the connected pump/motor to stroke to a central zero-displacement position, as described in more detail by reference to the co-pending application previously cited.

If current is lost to solenoid 873b, but solenoid 873a remains under control, solenoid 873a is still capable of placing the spool into either position depicted in FIGS. 4B and 4C, meaning that the controller can still cause the pump/motor to stroke in the direction associated with the spool position of FIG. 4B and lock it into that displacement. Similarly, if current is lost to solenoid 873a but not to solenoid 873b, solenoid 873b can still cause the pump/motor to stroke in the opposite direction associated with the spool position of FIG. 4D and lock it into that displacement. However, in neither case can the pump/motor be controlled to stroke in the angular direction associated with the respective unpowered solenoid, except by cutting current to the powered solenoid and allowing the biasing springs 883a and 883b to return the spool to the central position and stroke the pump/motor to zero.

Measures for Safe Startup

For ensuring safe startup, two measures are disclosed: (a) providing for displacement actuation control pressure to be taken from a point upstream of primary shut off valve 99 in order to allow for prepositioning the pump/motors to zero displacement before they are pressurized; and (b) providing for a secure displacement-holding means (passively or actively controlled) to prevent migration of the displacement away from a zero displacement position between shutdown and startup.

Pre-Positioning Feed

As previously mentioned, in the case of an over-center pump/motor it is possible to eliminate the mode valve otherwise needed by a positive-angle pump/motor, because the mode switching function is performed by the over-center action. However, this removes a convenient ability to isolate the pump/motor from the rest of the circuit prior to activating the high pressure source and thereby prevent unexpectedly powering the device if it is not at zero displacement at the time. Instead, for an over-center pump/motor without its own mode valve, only a high pressure shutoff valve situated somewhere between the high pressure accumulator and the device can so isolate the device, and it becomes doubly necessary to ensure that the pump/motor is in fact at zero displacement before high pressure is activated.

Additionally, the closure of shutoff valves 97 and 99 at the same time that the pump/motors are to be stroked to their extreme default displacement may in some circumstances deprive the actuators of sufficient hydraulic power, and thereby prevent the pump/motors from reaching that position.

To better provide for the above two situations, according to an embodiment, the high pressure powering the displacement control is optionally taken at a point in the circuit between high pressure accumulator 24 and valve 99 (e.g. as depicted by the location of fluid line 13 of FIG. 2), so that the displacement control continues to have access to the high pressure accumulator after the high pressure accumulator has been shut off to the rest of the circuit, thus providing power to command the connected pump/motor to zero displacement.

This is illustrated with reference to FIG. 2. High pressure line 13 is provided to connect high pressure ports 62 and 66 of respective control spools 41 and 42 to high pressure at a point between valve 99 and high pressure accumulator 24, thereby allowing both spools 41 and 42 to remain hydraulically powered even if valve 99 has disconnected the rest of the circuit from high pressure, and thereby allowing actuators 50a-d to control the displacement of pump/motors 22 and 21 even when the high pressure valve 99 has shut (either as part of the normal shut-down procedure or in response to a failure condition). Because the low pressure accumulator valve 97 (as well as valve 99) remain open to fluid inflow, valve 97 can still accept low pressure fluid being displaced from the displacement control.

At the beginning of the start-up procedure, when high pressure is still disconnected from the majority of the components in the circuit, the controller is thereby able to command the pump/motors to zero displacement to ensure safe startup of the system. Actuator feed line 13 is joined to the circuit between primary shutoff valve 99 and high-pressure accumulator 24. A preferred no-leakage on-off actuator feed line valve 78 isolates the actuator control valves from the circuit independently from primary shutoff valve 99. Optional check valve 89 is also provided to allow for greater flow to the actuator control valves during normal operation, while preventing the actuator feed lines from pressurizing the system after shutoff of valve 99 but while actuator feed line valve 78 is still open.

Another potential concern relates to providing hydraulic power to any hydraulically powered accessory systems after the high pressure accumulator has been isolated from the main circuit by the closing of valve 99 for safety reasons. Referring again to FIG. 2, accessory manifold 89a represents a juncture at which high pressure fluid to power accessory devices, such as for example a power steering unit or a power brake booster unit, might optionally be taken by means of representative accessory fluid line 89c. Taking accessory line 89c from this point in the system ensures that fluid flow to downstream accessory devices will not be interrupted when main valve 99 closes and valve 78 remains open. Additionally, in this configuration, valve 78 serves as an option to isolate the downstream accessory systems in the case of a significant fluid leak occurring in these systems.

Optional valve 89b may also be provided to isolate accessory line 89c and the downstream accessory system(s) separately. Valve 89b would normally be open, but in the case of detection of a leak in the accessory system, it is commanded closed if its closure would not reduce vehicle safety, such as when the vehicle is safely stopped.

Displacement-Holding Means

An alternative to powering the actuators from a point upstream of valve 99 would be to employ a displacement-holding means, such as a latch or detent mechanism, to mechanically ensure that the pump/motors remain at zero displacement between shutdown and startup. On shutdown, the command to each actuator would be set to zero displacement, and once the zero position is achieved, the displacement-holding means would prevent the pump/motors from leaving the zero displacement position until released.

A displacement-holding latch or detent could take any of several forms, for example, a mechanically spring-loaded bias of the yoke to a center position held by a mechanical detent, or an electronically actuated latch, such as by means of an solenoid piston that latches the yoke to the case by engaging the solenoid piston with a socket, or an electro-magnetic force. Yet another option might involve a passive detent mechanism in which a member slidably travels along a track as the yoke pivots, and is urged by a spring-loaded means to become engaged with a depression or similar feature in the track when the yoke is at zero displacement, thus requiring a significant force to move it away from the depression. Preferably, however, the latch or detent means should be able to be disengaged during normal operation and engaged only during the parking or shutdown process, to prevent its action from interfering with the normal stroking of the pump/motor across zero from pump to motor or from motor to pump. In this case the means would be engaged as part of the shutdown process and disengaged as part of the startup process.

Figure 5:
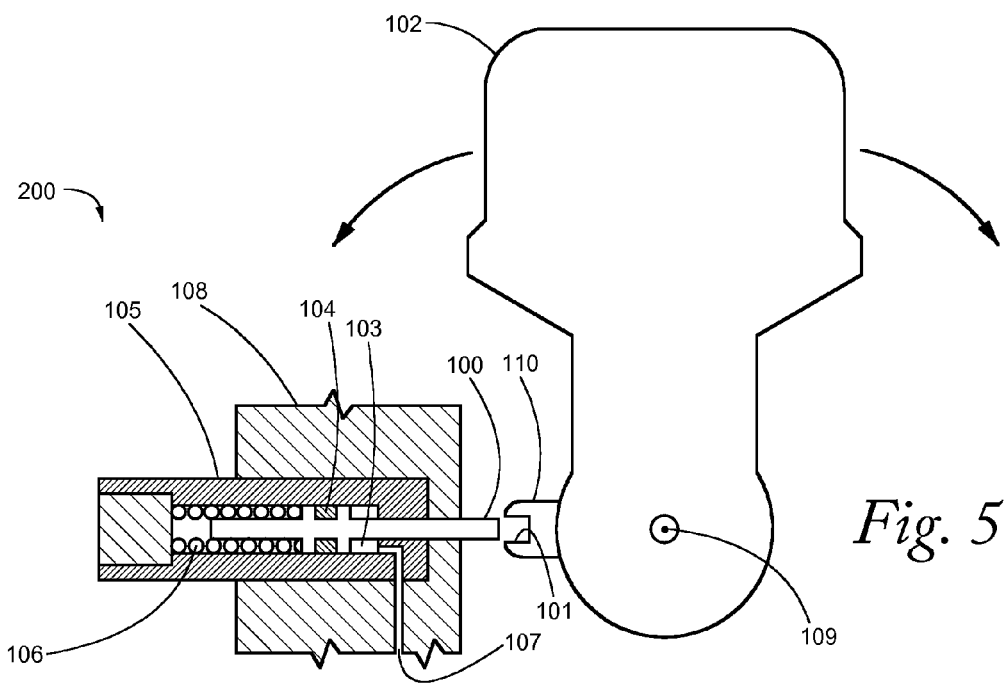
FIG. 5 shows a yoke latching mechanism in an inactive state in which the yoke is free to move to any displacement angle.
Figure 6:
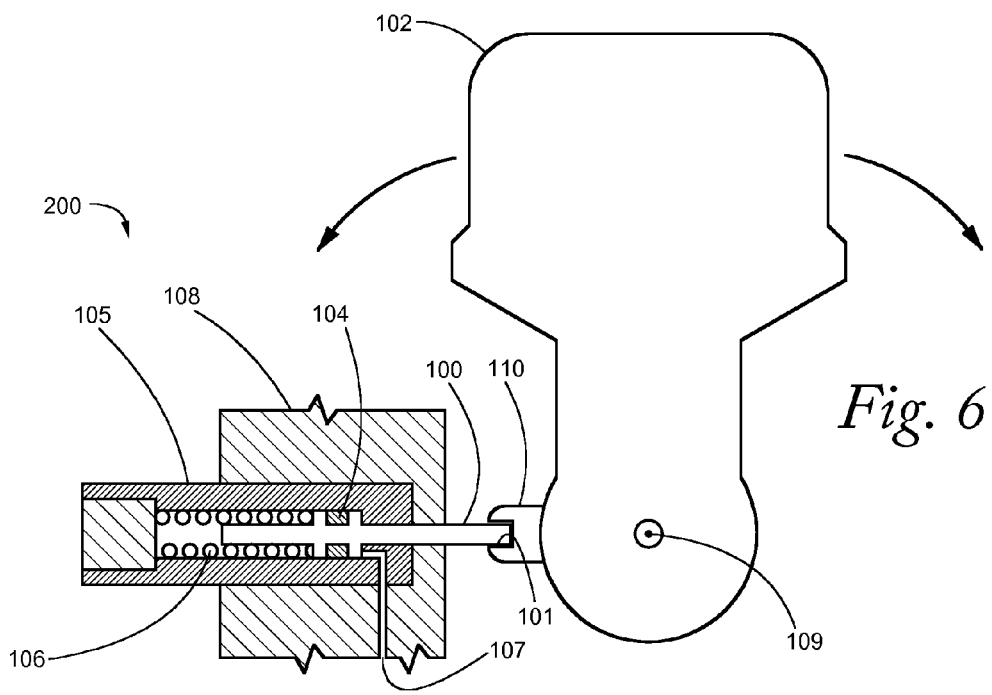
FIG. 6 shows a yoke latching mechanism in an active state in which the yoke is held to a zero displacement position.

FIGS. 5 and 6 illustrate an example of a preferred yoke latching mechanism. Yoke 102 rotates about pivot point 109 and thereby determines the displacement of an over-center pump/motor. Recess 101 resides in lobe 110 on yoke 102. Yoke 102 is depicted in a position corresponding to zero displacement. Latching piston 100 is configured to extend and retract relative to block 108 which is fixed relative to the angular movement of yoke 102. Latching piston 100 includes guide element 104 which here is a sealing gasket retained upon latching piston 100, thus forming chamber 103 into which high pressure fluid is received via fluid channel 107.

FIG. 5 depicts the latching mechanism in a retracted state, in which pivot of yoke 102 is not restricted. High pressure fluid has entered chamber 103 and exerts force against the surface of guide element 104, causing it to move leftward against a biasing force exerted by biasing spring 106, and thereby causing the latching piston 100 to retract into the depicted position.

FIG. 6 depicts the latching mechanism in an extended state, in which yoke 102 is thereby locked in the zero displacement position. The fluid pressure in the high pressure circuit, to which passage 107 is connected, has fallen to a much lower pressure due to disconnection of the high pressure source. Accordingly, the pressure of fluid formerly resident in chamber 103 (as depicted in FIG. 5) is not sufficient to resist the biasing force exerted by biasing spring 106 and has been pushed out of the chamber by the resultant movement rightward of latching piston 100, causing latching piston 100 to extend and enter recess 101 in yoke 102. Latching piston 101 thereby restrains movement of yoke 102 away from the zero displacement position.

Alternately, recess 101 may reside in a different location on the yoke. For example, it may reside on a side or top of the yoke, or on any portion of the yoke that sweeps with the motion of the yoke and takes on a predictable position at zero displacement, just as does the trunnion-mounted lobe in the depicted example.

In connection with an appropriate shutdown procedure, the latching mechanism thereby automatically responds to hold the yoke at zero displacement. If the shutdown procedure includes setting of the pump/motor to zero displacement, followed by disconnection of the high pressure source and resultant bleed-down of pressure in the high pressure circuit, recess 101 of yoke 102 will thereby be positioned to receive latching piston 100 as it automatically extends in reaction to the bleed-down of pressure.

In an alternate embodiment, the yoke latch includes a normally retracted piston that, on loss of power, automatically extends so as to catch the yoke as it strokes past the zero displacement position toward an extreme position.

It will be appreciated that the engaging action of piston 100 can similarly be provided by other means, such as a solenoid piston actuated by an electrical current, or by a piston extended by magnetic force, or by a magnetic force alone, or by any similar mechanical means commonly known in the art.

It will also be understood that the displacement-holding function here exemplified by the piston 100 engaging with a yoke 102 may equally well be applied to a pump/motor that has a sliding back plate design instead of a yoke design, for example, by utilizing a similar piston arrangement to lock the sliding back plate to a specific position with respect to the surface on which it slides.

Safe Shutdown and Startup Procedures

The following discussion discloses embodiments of a safe shutdown and startup procedure. In a first preferred embodiment, the previously described yoke latching means holds the over-center pump/motor(s) at zero displacement between shutdown and startup. In a second embodiment, the high pressure actuator feed is separately accessed as previously described so that the pump/motor(s) may be commanded to zero displacement if necessary prior to startup.

In the first embodiment, on shutdown, each pump/motor is verified to be at zero displacement and its latching means engaged to hold it at zero displacement. The main high pressure valve is then closed and confirmed by monitoring the resultant bleed-down in the high pressure lines. The low pressure source is then closed to outflow and power is removed from the actuator spool control solenoid.

Figure 7:
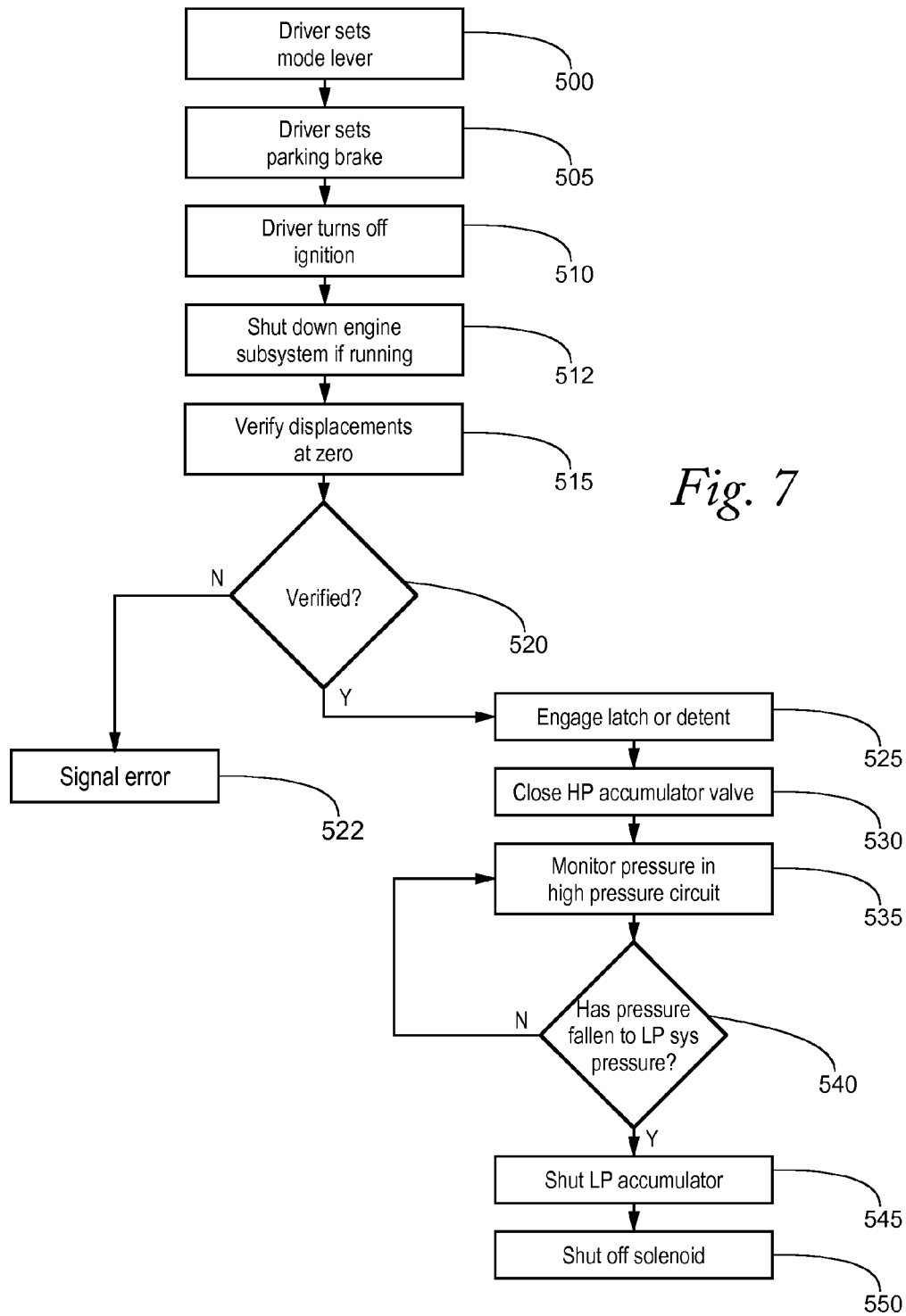
FIG. 7 is a flowchart depicting a safe shutdown procedure as it would be initiated by the driver of the vehicle.

This process is more precisely related in FIG. 7. Normally it would be expected that, for any vehicle, the shutdown process would be preceded by the driver bringing the vehicle to a stop and placing a mode lever (e.g., such as a gear shift lever having positions P-R-D-L) to a Park position (500) (optionally thereby engaging a parking pawl to further immobilize the vehicle), and engaging a parking brake (505). The driver would then turn the ignition key to an Off position (510), indicating to the vehicle controller that the vehicle should be shut down. According to the invention, this action would cause the controller to shut down the engine/engine pump subsystem if it is running (512) by turning off the engine and stroking the engine pump to zero displacement, according to an appropriate shutdown procedure for that subsystem (not shown). The controller then verifies that all pump/motors are at zero displacement (515, 520). Because the vehicle is at a stop and the engine subsystem has been shut down, the drive pump/motor(s) and engine pump should be at zero displacement already. If not, an error is thrown (522) as this is an unexpected condition indicating a possible malfunction, and an appropriate alternate shutdown procedure may be invoked (not shown). If verified, the controller then engages pump/motor latching means for all pump/motors (525), thus securely holding them to their respective zero displacement positions. Next the controller closes the high pressure valve (530), and monitors the high pressure side (535, 540) to confirm that the pressure on the high pressure side of the circuit has bled down to the pressure of the low pressure side. When thus confirmed, the low pressure accumulator shut off valve is then closed to outflow (545), and the current to the displacement control spool solenoid is turned off (550).

On startup, the displacement of each pump/motor is verified to have remained at zero displacement. Each actuator spool control solenoid is then deliberately commanded to the zero displacement position in anticipation of pressure being restored. The high pressure valve is then opened, pressurizing the system.

Figure 8:
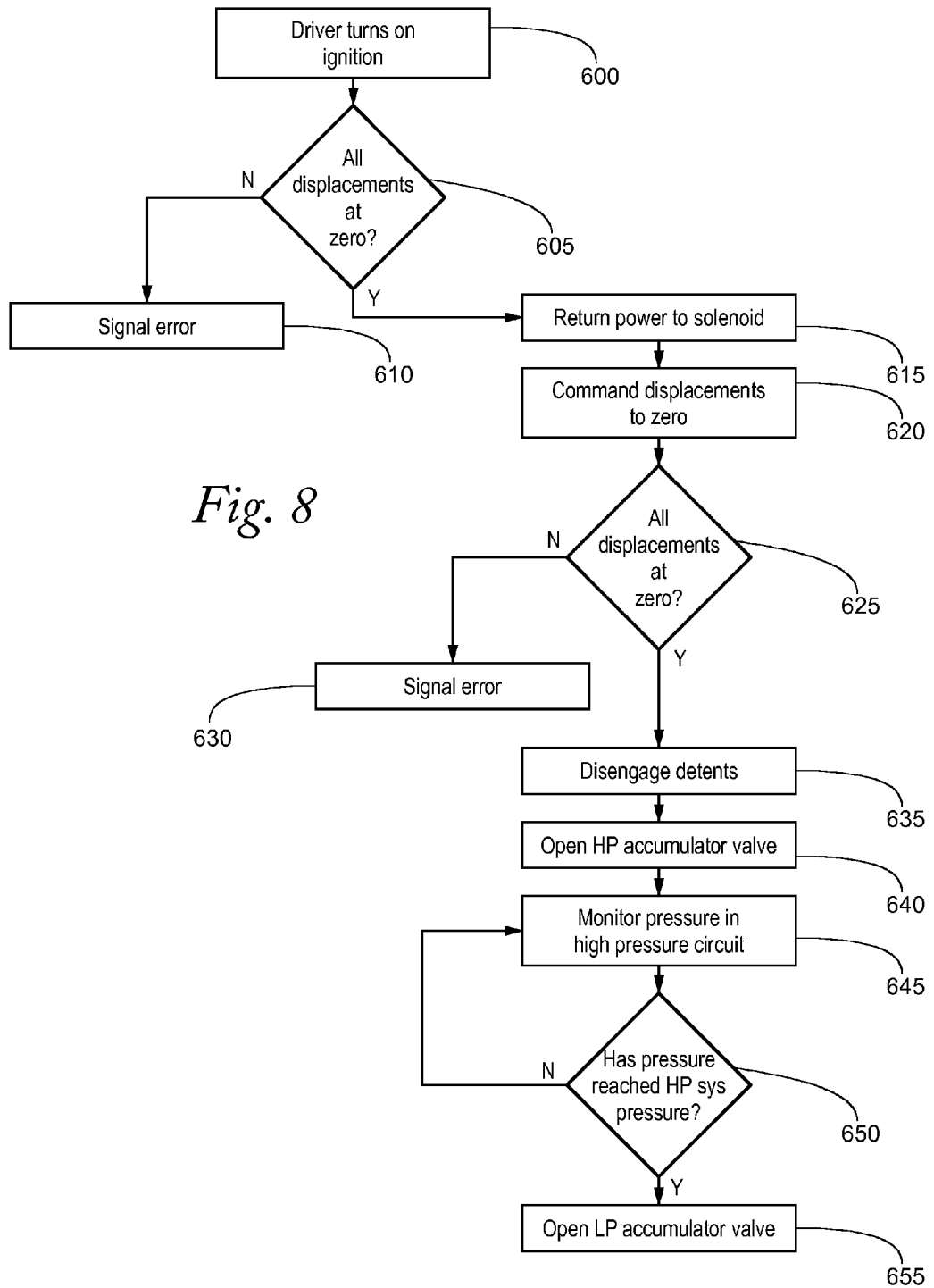
FIG. 8 is a flowchart depicting a safe startup procedure as it would be initiated by the driver of the vehicle.

This process is detailed in FIG. 8. The driver initiates the procedure by turning the ignition key to an On position (600), which starts the controller and signals that the vehicle systems should be started up. Next, the controller takes a series of actions including: (605) confirming each pump/motor to be in the zero displacement position as previously set by the shutdown procedure, and if not, reporting an error (610) and terminating the startup process. If the displacements are confirmed to be at zero, power is returned (615) to the displacement control spool solenoids, and the solenoids are commanded to the position that commands zero displacement (620). Optionally the displacement of each pump/motor is now verified again to be at zero displacement (625), and if not so verified, an error is reported (630) and the startup process is terminated. Otherwise all yoke latches or detent(s) are disengaged (635) and the high pressure valve is opened (640), pressurizing the system. The high pressure circuit is then monitored (645, 650) until it is confirmed that high pressure has returned to the circuit, at which point the low pressure accumulator valve is opened (655), enabling the circuit for use. Optionally the control system may prevent the parking pawl and parking brake from being released until after this process has completed.

In the second embodiment, on shutdown, an actuator feed line valve remains open to power the displacement actuators after the main high pressure valve is closed. This prevents the need for steps related to engagement and disengagement of a zero-displacement latch or detent.

Figure 9:
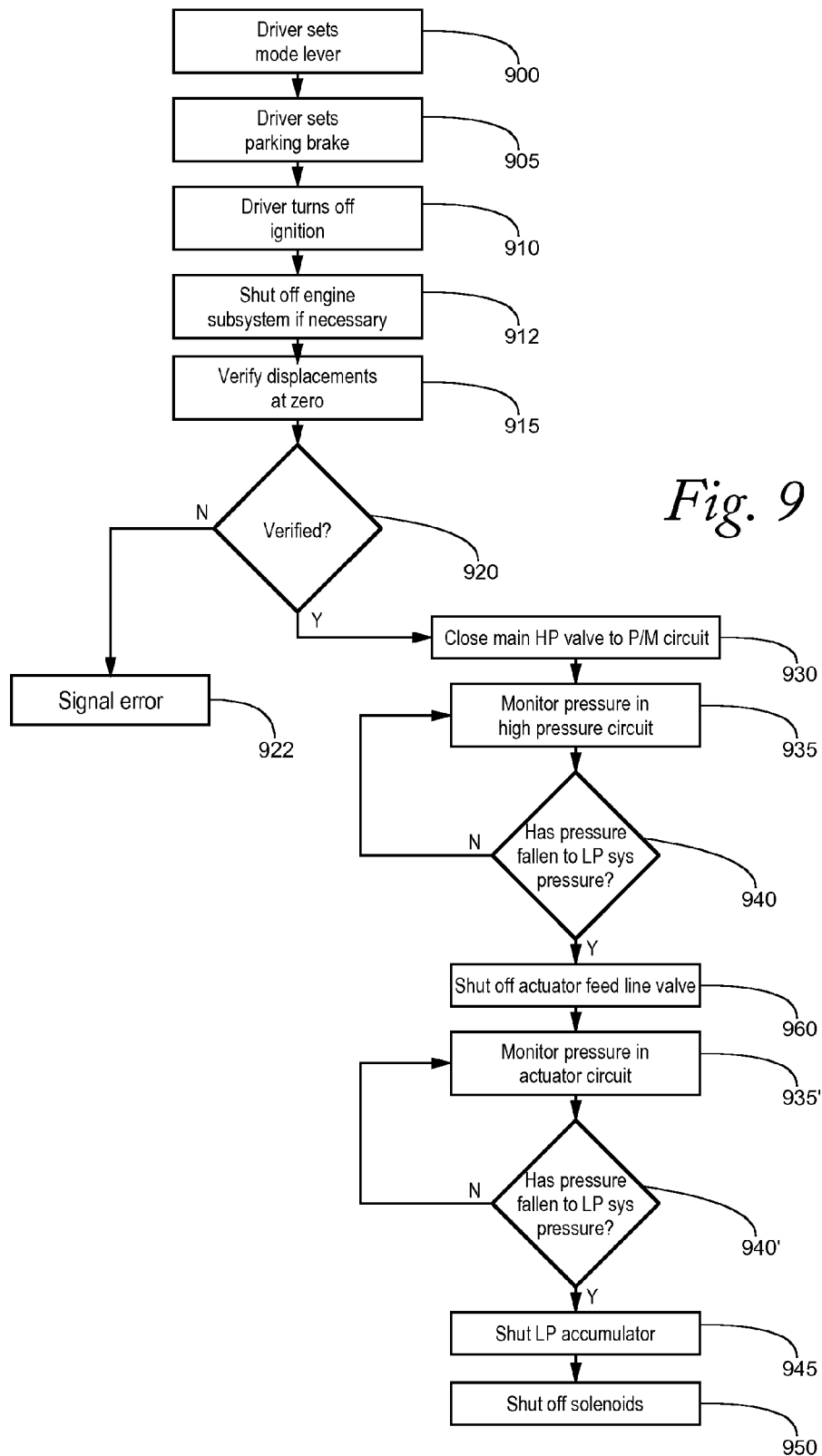
FIG. 9 is a flowchart depicting another safe shutdown procedure as it would be initiated by the driver of the vehicle.

This process is more precisely related in FIG. 9. Normally it would be expected that, for any vehicle, the shutdown process would be preceded by the driver bringing the vehicle to a stop and placing a mode lever (e.g., such as a gear shift lever having positions P-R-D-L) to a Park position (900) (optionally thereby engaging a parking pawl to further immobilize the vehicle), and engaging a parking brake (905). The driver would then turn the ignition key to an Off position (910), indicating to the vehicle controller that the vehicle should be shut down. According to the invention, this action would cause the controller to shut down the engine/engine pump subsystem if it is running (912) by turning off the engine and stroking the engine pump to zero displacement, according to an appropriate shutdown procedure for that subsystem (not shown). The controller then verifies that all pump/motors are at zero displacement (915, 920). Because the vehicle is at a stop and the engine subsystem has been shut down, the drive pump/motor(s) and engine pump should be at zero displacement already. If not, an error is thrown (922) as this is an unexpected condition indicating a possible malfunction, and an appropriate alternate shutdown procedure may be invoked (not shown). If verified, the controller then closes (930) the primary high pressure valve (leaving the actuator portion of the circuit pressurized), and monitors the high pressure side of the main circuit (935, 940) to confirm that the pressure has bled down to a pressure similar to the pressure of the low pressure side. When thus confirmed, the actuator feed line valve is closed (960) (including if necessary the closing of any secondary isolation means located between the actuator feed line valve and the high-pressure accumulator), and the pressure in the actuator feed circuit monitored until it has bled down to low pressure (935', 940'). When thus confirmed, the low pressure accumulator shut off valve is then closed to outflow (945), and the current to the displacement control spool solenoids is turned off (950). Delaying the removal of power from the solenoid until after all actuation pressure has bled down acts to improve the likelihood that the displacements will remain at or near zero during the shutdown process.

On startup, the actuator feed line valve is opened prior to the main high pressure valve, and employed to ensure that the pump/motors are at zero displacement when the high pressure valve is finally opened.

Figure 10:
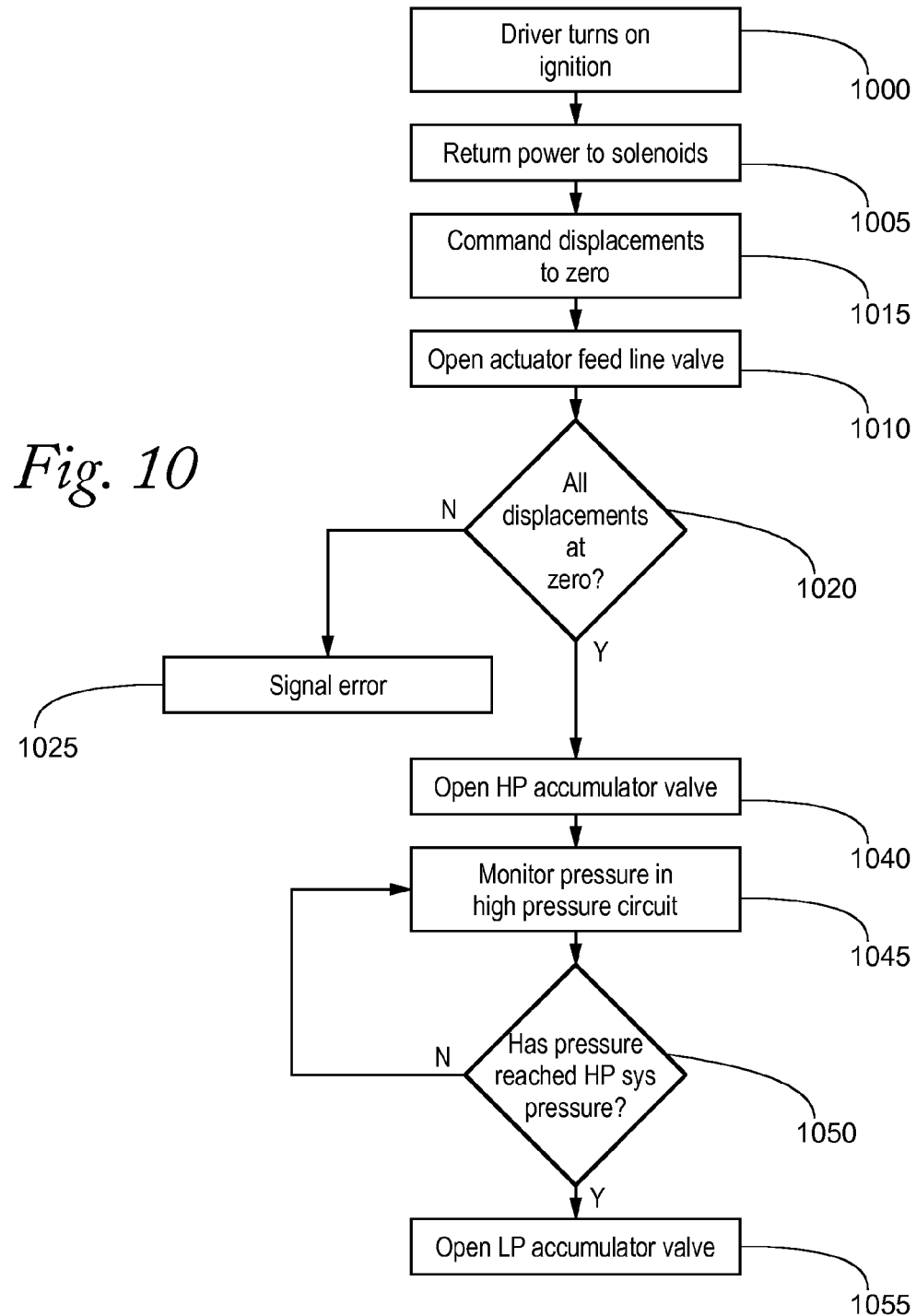
FIG. 10 is a flowchart depicting another safe startup procedure as it would be initiated by the driver of the vehicle.

This process is detailed in FIG. 10. The driver initiates the procedure by turning the ignition key to an On position (1000), which starts the controller and signals that the vehicle systems should be started up. Next, the controller takes a series of actions including: power is returned (1005) to the displacement control spool solenoids, and the solenoids are commanded to the position that commands zero displacement (1015). The actuator feed line valve is then opened (1010) (including if necessary the opening of any secondary isolation means located between the actuator feed line valve and the high-pressure accumulator), pressurizing the actuator circuit so as to allow the pump/motors to be so commanded to zero. The displacements are then verified to be at zero (1020), and if not so verified, an error is reported (1025) and the startup process terminated. If verified, the main high pressure valve is opened (1040). The main high pressure circuit is then monitored (1045, 1050) to ensure that high pressure has returned to the circuit. If so, the low pressure accumulator valve is opened (1055), enabling the circuit for use. Optionally the control system may prevent the parking pawl and parking brake from being released until after this process has completed.

As an alternative to providing for displacement prepositioning by plumbing an actuator high-pressure feed line above the primary shutoff valve, a priming pump may instead or additionally be employed for providing sufficient pressure to the actuator feed line to preposition the pump/motors. The priming pump would have a connection to the low pressure side of the circuit and a connection to the high pressure actuator input line, and in order to achieve prepositioning pressure, would pump fluid to the actuators. A relief valve may also be plumbed in at an appropriate location to prevent dead heading of the priming pump as the actuators become filled.

While some embodiments of a primary shutoff valve could have a piloted configuration that allows it to be opened from a closed state on command, such as by electric solenoid or hydraulic command, other embodiments might require that fluid on both sides of the valve first be made relatively equal in order for the valve to be opened, while still other embodiments might require that fluid flow through the valve from the low pressure side to the high pressure side in order to open it. For example, a plunger-style valve or a cartridge valve, in order to be inexpensive to manufacture, might be used in a non-piloted configuration. Such a valve would require a tremendous force to open if the pressure on both sides is not equalized first, or for example in the case of a valve having a seated plunger, could quite easily be opened by forcing fluid from the low side to the high side across the valve such that the plunger is displaced from the seat thereby opening the valve.

To accommodate such configurations of a shutoff valve, one embodiment of the invention employs a priming pump to pre-pressurize the fluid circuit on the lower pressure side of a shutoff valve so that it matches or is closer to the pressure on the high pressure side, allowing the valve to more easily open. Another embodiment employs the priming pump to pump sufficient fluid from the lower pressure side of the valve across to the higher pressure side that the valve becomes opened. These methods may be applied as part of the startup procedure for the vehicle, or applied at any time a shutoff valve is closed and it is desired that it be opened.

Another embodiment of the invention starts the engine and drives the engine pump as a pump, sufficiently to pressurize the high pressure side of the main hydraulic circuit until pressures across a shutoff valve (such as for example the primary shutoff valve) are equalized allowing the valve to more easily open. Another embodiment starts the engine and drives the engine pump as a pump, to pump sufficient fluid from the lower pressure side of the valve across to the higher pressure side that the valve becomes opened. These methods may be applied as part of the startup procedure for the vehicle, or applied at any time a shutoff valve is closed and it is desired that it be opened.

For example, consider a circuit configuration in which there is a first primary shutoff valve protecting the main pump/motor circuit, and a second shutoff valve at the high pressure accumulator outlet. Between the two shutoff valves there is plumbed a connection to the high pressure actuator system (actuator feed line) that is used for prepositioning the displacement of the over-center pump/motors as previously described. The first primary shutoff valve is an unpiloted valve that in order to be opened from a closed state requires that pressure be relatively equal across the valve, or requires that fluid be driven across it toward the high pressure accumulator. The second shutoff valve in contrast is a piloted, pressure-equalized valve that can be opened from a closed state on electronic or hydraulic command. To start this system from a state in which both valves are closed, first the second shutoff valve (at the accumulator) would be commanded open, thus pressurizing the portion of the circuit between the two valves, and also pressurizing the actuator feed line (optionally a valve can also exist on this line which would then be opened to power the actuator system). Next, in order to open the first primary valve, the circuit below the valve (on the pump/motor side) would be pressurized by means of the engine pump. First, the engine pump would be set to zero displacement, using the high pressure feed provided by the now pressurized actuator feed line. Then the engine is started, and the engine pump set to pump mode at an appropriate displacement, causing fluid to be pumped from the engine pump toward the first primary shutoff valve. This fluid flow across the valve serves to open the valve, for example, by causing it to displace from its seat.

In other words, after the second shutoff valve (nearer the high pressure accumulator) is opened, the actuator feed line for pre-positioning becomes pressurized. This allows the engine pump to be safely commanded to zero displacement. The engine that drives the engine pump can then be started. The engine pump is then brought to pumping mode at an appropriate displacement to pressurize the line, causing fluid to be pumped toward the first primary shutoff valve and ultimately toward the high pressure accumulator. This causes the first primary shutoff valve to open. It may then be commanded to remain open once having reached the open state, after which the system operates as normally. When it is desired that it be closed again, the command is removed and fluid flow will shut the valve.

Now being familiar with the use of the engine pump to pressurize the circuit below a primary shutoff valve in order to equalize pressures across it or to open it, it will also be clear that a priming pump may be used for the same purpose if plumbed into the circuit appropriately.

Figure 13:
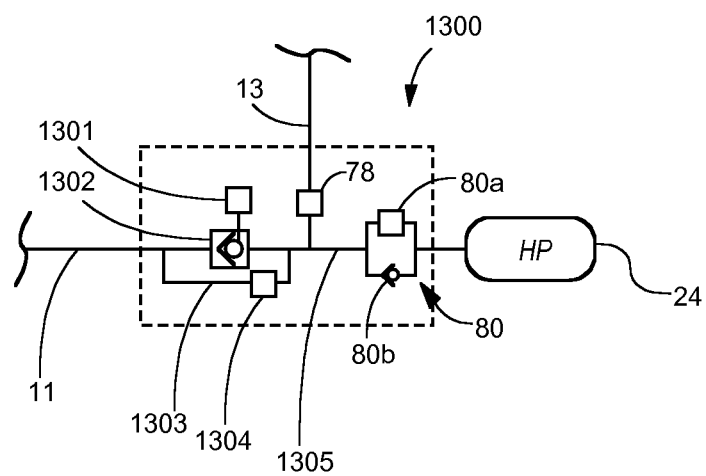
FIG. 13 depicts an integrated shutoff valve with several integrated functions.

Referring finally to FIG. 13, an integrated shutoff valve unit 1300 is depicted. Valve unit 1300 embodies several of the functions previously described in a preferably single unit for easy installation and low cost. First primary shutoff valve 1302 protects the pump/motors from the high pressure source by the ability to shut off fluid flow into line 11 which leads toward the high pressure ports of the pump/motors (remainder of circuit is not shown), while allowing fluid to flow in the opposite direction toward the high pressure source (accumulator 24). Hold-open means 1301 provides for an ability to keep valve 1302 in an open position once it has been opened (for example, this could be by means of a simple hydrostatic lock). Alternatively, hold-open means 1301 could be an actuator that can open valve 1302 with a small force if pressure is at least relatively equalized across valve 1302. Second shutoff valve 80 governs the outlet of the high pressure accumulator 24 and can be opened on command by means of, for example, a pressure equalized pilot valve (not shown) as disclosed in applicant's U.S. Pat. No. 6,619,325. When valve 80 is open, inter-valve passage 1305 is pressurized. Actuator feed line 13 (governed by optional actuator feed line valve 78) connects to inter-valve passage 1305 to provide high pressure fluid for displacement actuation of the pump/motors. Pressurization passage 1303 connects line 11 and inter-valve passage 1305 when pressurization valve 1304 is open. To start up the system when both valve 1302 and 80 are closed, first valve 80 is commanded open. This pressurizes inter-valve passage 1305. Actuator feed line valve 78 (if provided) is then opened, pressurizing actuator feed line 13 thus allowing any prepositioning of pump/motor displacements to zero to take place. After prepositioning, pressurization valve 1304 is then opened, equalizing the pressure on both sides of primary valve 1302. This pressurizes line 11, meaning that the rotating groups of the pump motors will now have access to pressure but have been set to zero displacement prior. At this point, valve 1302 may be opened by a small force of a simple actuator (not shown). Alternatively, the engine pump, or a priming pump in fluid communication with line 11, may pump fluid from line 11 toward valve 1302 in order to open it by fluid flow as previously described. Similarly this valve unit 1300 and its embodied methods may be used with any of the startup methods described. Valve unit may be affixed directly to the outlet end of the high pressure accumulator 24 to provide all of these functions in a compact space.

Figure 11:
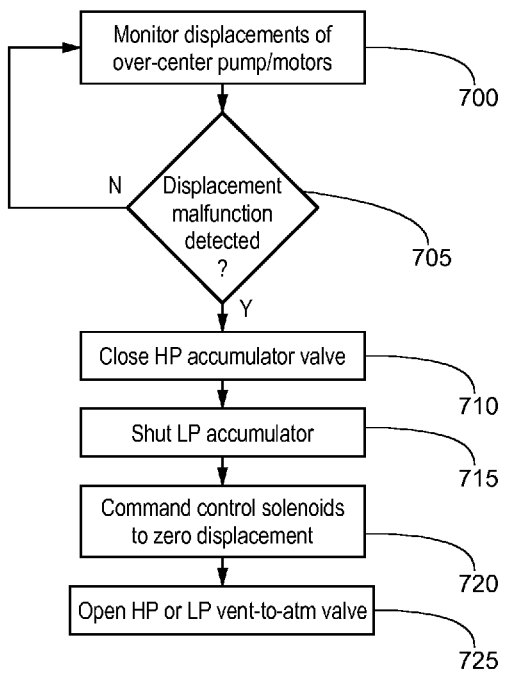
FIG. 11 is a flowchart depicting a displacement monitoring loop performed by the vehicle controller, and an emergency shutdown procedure resulting from detection of a displacement control malfunction.
Figure 12:
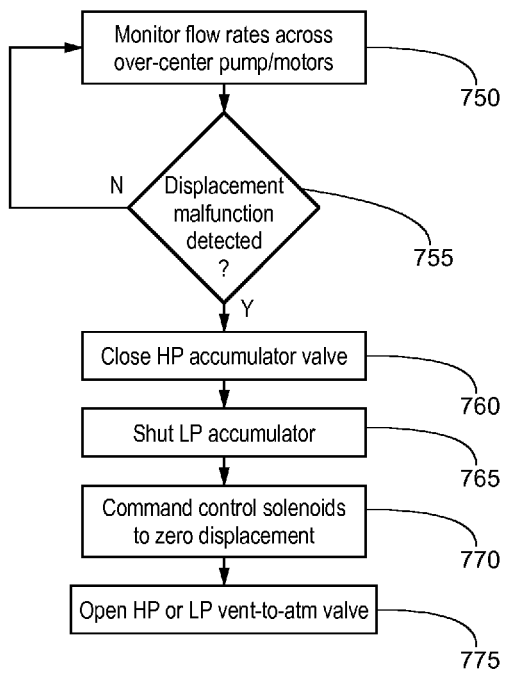
FIG. 12 is a flowchart depicting a fluid flow monitoring loop performed by the vehicle controller, and an emergency shutdown procedure resulting from detection of a fluid flow anomaly indicating a displacement control malfunction or a fluid leak.

A safe operating procedure for the hydraulic hybrid vehicle is now detailed in FIGS. 11 and 12. Referring to FIG. 11, the controller continually monitors (700) all pump/motor displacements by means of mechanical or electronic feedback, for example, by means of yoke position sensors that monitor the actual position of the yoke of each pump/motor. If it is determined that a detected pump/motor displacement does not match the displacement to which the pump/motor has been commanded (to within a predetermined tolerance) (705), an emergency shutdown procedure is initiated by the controller, including the steps: (710) closing the high pressure shutoff valve(s) to outflow, (715) closing the low pressure accumulator valve to outflow, (720) commanding all displacement control solenoids to a position that commands zero displacement, and (725) opening the high pressure and/or low pressure vent valve(s) to respective low-pressure tank(s) as previously described in order to depressurize a portion of the circuit between the pump/motors and the accumulators.

Referring to FIG. 12, optionally, the controller continually monitors the flow and/or pressure drops across each pump/motor in order to determine whether they are consistent with the commanded displacement (750). If not, a displacement control malfunction is indicated (755), and an emergency shutdown procedure is initiated by the controller, including the steps: (760) closing the high pressure shutoff valve(s) to outflow from the high pressure accumulator, (765) closing the low pressure accumulator valve to outflow, (770) commanding the displacement control solenoids to a position that commands zero displacement, and (775) opening the high pressure and/or low pressure vent valve(s) to respective low-pressure tank(s) as previously described in order to depressurize a portion of the circuit between the pump/motors and the accumulators.

In another embodiment of the invention, if it is detected that the drive motor is stuck at displacement in pumping mode (that is, while performing regenerative braking), the low pressure accumulator is shut off to outflow first, optionally followed by shut off of the high pressure accumulator. Shutting off the low pressure accumulator to outflow immediately prevents additional fluid from entering the circuit, and although cavitation would occur, regenerative braking force would be greatly diminished so as to allow a more controlled stop of the vehicle.

In this disclosure, the term motor is to be construed to include motors, pumps, and pump/motors. It is well known in the art that many hydraulic machines can be operated as a pump or as a motor, depending upon the direction of torque relative to the direction of rotation. In the present description, to distinguish between motors limited to positive-stroke angles and motors capable of positive- and negative-stroke angles, the former are referred to as positive-angle motors, and the latter are referred to as over-center motors. While the embodiments described herein are generally configured for hydraulic fluid operation, the term fluid is to be construed to include both hydraulic and pneumatic fluids. Terms such as input, output, supply, and control are used to refer to fluid ports and transmission lines. These terms are for convenience only, and are not limiting with respect to the function or operation of the structures described. For example, a valve port coupled via a transmission line to a high-pressure fluid source may be referred to as a high-pressure input port, even though it will be understood that fluid may flow in either direction between the port and the fluid source, depending on the mode of operation of the associated system.

While the motor operation described with reference to the disclosed embodiments are bent-axis type motors, it is well known that other types of fluid motors, including swash plate and radial piston motors, for example, can be configured for over-center operation. Accordingly, the scope of the invention is not limited to bent-axis motors.

Various embodiments have been disclosed in the context of a fail-safe network for a fluid power system of a hydraulic hybrid vehicle. The scope of the invention is not limited to systems that employ all the disclosed components, or to vehicle systems in general.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for failsafe operation of a hydraulic circuit for a hydraulic hybrid vehicle having an engine mechanically connected to a pump/motor, a drive pump/motor mechanically connected to the drive wheels, a displacement control means controlling a displacement actuation means for said pump/motors, a high-pressure fluid source supporting the circuit, and a low-pressure fluid source supporting the circuit, at least one of said pump/motors being an over-center pump/motor, the method comprising:
   responding to a failure of control of displacement of an over-center pump/motor by closing the high-pressure fluid source to fluid outflow;
   closing the low-pressure fluid source to fluid outflow; and
   providing for displacement of the over-center pump/motor to default to a displacement corresponding to a mechanically limited stroke angle extreme, further comprising depressurizing a low-pressure fluid line connected to the over-center pump/motor.

2. A method for failsafe operation of a hydraulic circuit for a hydraulic hybrid vehicle having an engine mechanically connected to a pump/motor, a drive pump/motor mechanically connected to the drive wheels, a displacement control means controlling a displacement actuation means for said pump/motors, a high-pressure fluid source supporting the circuit, and a low-pressure fluid source supporting the circuit, at least one of said pump/motors being an over-center pump/motor, the method comprising:

responding to a failure of control of displacement of an over-center pump/motor by closing the high-pressure fluid source to fluid outflow;
closing the low-pressure fluid source to fluid outflow; and
providing for displacement of the over-center pump/motor to default to a displacement corresponding to a mechanically limited stroke angle extreme, further comprising:
deactivating the engine if it is in operation, and
depressurizing a high-pressure fluid line connected to the over-center pump/motor.

3. A fluid system for a hydraulic hybrid vehicle, comprising:

a first over-center pump/motor having a first port for a high-pressure fluid supply and a second port for a low-pressure fluid supply and acting as a drive motor, being mechanically connected to one or more drive wheels of the vehicle:
a second over-center pump/motor having a first port for a high-pressure fluid supply and a second port for a low-pressure fluid supply and acting as an engine pump;
at least one of the first or second over-center pump/motors being configured without an isolation valve capable of isolating its first port from the high-pressure fluid supply;
a high-pressure fluid source connecting with the fluid system at a first juncture between the respective first ports of the first and second pump/motors;
a low-pressure fluid source connecting with the fluid system at a second juncture between the respective second ports of the first and second pump/motors;
an actuation system configured to control changes in displacement of the respective pump/motor; and
a primary high-pressure fluid supply valve for stopping fluid flow from the high-pressure fluid source toward the pump/motors, further comprising:
a first line depressurization means, including:
a first depressurization passage in fluid communication with the first port of the drive pump/motor;
a first low-pressure fluid holding tank in fluid communication with the depressurization passage; and
a first fluid venting valve disposed on the first depressurization passage between the first port of the drive pump/motor and the first low-pressure fluid holding tank;
said first fluid venting valve when open allowing fluid to enter the first low-pressure fluid holding tank.

4. A fluid system for a hydraulic hybrid vehicle, comprising:

a first over-center pump/motor having a first port for a high-pressure fluid Supply and a second port for a low-pressure fluid supply and acting as a drive motor, being mechanically connected to one or more drive wheels of the vehicle;
a second over-center pump/motor having a first port for a high-pressure fluid supply and a second port for a low-pressure fluid supply and acting as an engine pump;
at least one of the first or second over-center configured without an isolation valve capable of isolating its first port from the high-pressure fluid supply;
a high-pressure fluid source connecting with the fluid system at a first juncture between the respective first ports of the first and second pump/motors;
a low-pressure fluid source connecting with the fluid system at a second juncture between the respective second ports of the first and second pump/motors;
an actuation system configured to control changes in displacement of the respective pump/motor; and
a primary high-pressure fluid supply valve for stopping fluid flow from the high-pressure fluid source toward the pump/motors, further comprising:
a second line depressurization means, including:
a second depressurization passage in fluid communication with the second port of the drive pump/motor;
a second low-pressure fluid holding tank in fluid communication with the second depressurization passage; and
a second fluid venting valve disposed on the second depressurization passage between the second port of the drive pump/motor and the second low-pressure fluid holding tank;
said second fluid venting valve when open allowing fluid to enter the second low-pressure fluid holding tank.

5. A method for shutting down a hydraulic hybrid vehicle having an over-center pump/motor with a displacement control valve, a displacement-holding means for said pump/motor, a high-pressure fluid supply valves fluidly connecting a high-pressure fluid source to the over-center pump/motor through a high pressure side of a fluid circuit, and a low-pressure fluid supply valve fluidly connecting a low-pressure fluid source to the over-center pump/motor through a low pressure side of the fluid circuit, the method comprising:

sensing a signal to power down the vehicle;
commanding the pump/motor to zero displacement;
engaging the displacement-holding means to hold the displacement at substantially zero after the pump/motor has attained substantially zero displacement;
closing the high pressure fluid supply valve to fluid outflow;
monitoring the fluid pressure in the high pressure side of the circuit;
closing the low-pressure fluid supply valve to outflow after the fluid pressure in the high pressure side of the circuit has dropped to substantially the pressure in the low-pressure side of the circuit; and
removing electrical power from the displacement control valve after the low-pressure fluid supply valve is closed.

6. A method for powering up and shutting down a hydraulic hybrid vehicle having an over-center pump/motor with a displacement control valve, a displacement-holding means for said pump/motor, a high-pressure fluid supply valves fluidly connecting a high-pressure fluid source to the over-center pump/motor through a high pressure side of a fluid circuit, and a low-pressure fluid supply valve fluidly connecting a low-pressure fluid source to the over-center pump/motor through a low pressure side of the fluid circuit, the method comprising:

sensing a signal to power up the vehicle;
verifying that the pump/motor is at substantially zero displacement; and if thus verified,
restoring electrical power to a displacement control valve;
commanding the displacement control valve to a position corresponding to hydraulically actuating the pump/motor to substantially zero displacement;
disengaging the displacement-holding means;
opening the high pressure fluid supply valve; and
opening the low pressure fluid supply valve.

7. The method of claim 6, further comprising:
between the step of commanding the displacement control valve and the step of disengaging the displacement-holding means, verifying that the pump/motor is at substantially zero displacement, and terminating the startup process if not;
after the step of opening the high pressure fluid supply valve, proceeding to the step of opening the low pressure fluid supply valve only after the pressure in the high pressure side of the circuit has reached an expected pressure.

8. The method of claim 6, further comprising:
sensing a signal to power down the vehicle;
verifying that the pump/motor is at substantially zero displacement; and if so verified,
closing a first valved connection between the high-pressure fluid source and the pump/motor;
monitoring the fluid pressure on the high pressure side of the circuit; and
after the fluid pressure in the high pressure side of the circuit has dropped to substantially the pressure in the low-pressure side of the circuit,
closing a second valved connection between the high-pressure fluid source and the displacement control valve;
closing the low-pressure fluid supply valve; and
removing electrical power from the displacement control valve.

9. The method of claim 8, further comprising:
after the step of closing the second valved connection, proceeding to the step of closing the low-pressure fluid supply valve only after the pressure in the high pressure side of an actuator circuit has reached an expected pressure.

10. A method for safely powering up a hydraulic hybrid vehicle having an over-center pump/motor, high- and low-pressure fluid supply valves fluidly connecting high- and low-pressure fluid sources to the over-center pump/motor through a fluid circuit, a first valved connection between the high-pressure fluid source and said pump/motor, and a second valved connection between the high-pressure fluid source and a displacement control system that includes a displacement control valve controlling the displacement of said pump/motor, the method comprising:
sensing a signal to power up the vehicle;
restoring electrical power to the displacement control valve;
setting the displacement control valve to a position corresponding to hydraulically actuating the pump/motor to substantially zero displacement;
opening the second valved connection so as to hydraulically energize the displacement control system;
verifying that the pump/motor is at zero displacement; and after so verifying,
opening the first valved connection,
opening the low-pressure fluid supply valve, and
after the step of opening the first valved connection, proceeding to the step of opening the low pressure fluid supply valve only after the pressure in the high pressure side of the circuit has reached an expected pressure.

* * * * *